(12) United States Patent
Chan et al.

(10) Patent No.: US 8,583,938 B2
(45) Date of Patent: Nov. 12, 2013

(54) FROM POLYMORPHIC EXECUTABLE TO POLYMORPHIC OPERATING SYSTEM

(76) Inventors: Kam Fu Chan, Hong Kong (CN); Bean Lee, Hong Kong (CN)

( * ) Notice: Subject to any disclaimer, the term of this patent is extended or adjusted under 35 U.S.C. 154(b) by 1273 days.

(21) Appl. No.: 12/311,205

(22) PCT Filed: Sep. 20, 2006

(86) PCT No.: PCT/IB2006/053395
§ 371 (c)(1),
(2), (4) Date: Mar. 19, 2009

(87) PCT Pub. No.: WO2008/035141
PCT Pub. Date: Mar. 27, 2008

(65) Prior Publication Data
US 2010/0017624 A1    Jan. 21, 2010

(51) Int. Cl.
G06F 11/30    (2006.01)
G06F 12/14    (2006.01)
G06F 9/44    (2006.01)
G06F 9/45    (2006.01)

(52) U.S. Cl.
USPC ........... 713/190; 713/167; 717/116; 717/139; 717/140

(58) Field of Classification Search
USPC .......................... 713/167, 190; 717/139–140
See application file for complete search history.

(56) References Cited

U.S. PATENT DOCUMENTS

2002/0152457 A1 * 10/2002 Jahnke .......................... 717/139
2005/0257054 A1 * 11/2005 Tucker et al. ................. 713/167

* cited by examiner

*Primary Examiner* — Evans Desrosiers
(74) *Attorney, Agent, or Firm* — Buchanan Ingersoll & Rooney PC

(57) ABSTRACT

A method, capable of being implemented in executable instructions or programmes in device(s), including computer system(s) or computer-controlled device(s) or operating-system-controlled device(s) or system(s) that is/are capable of running executable code, providing for the creation in Device(s) of executable code, such as boot code, programmes, applications, device drivers, or a collection of such executables constituting an operating system, in the form of executable code embedded or stored into hardware, such as embedded or stored in all types of storage medium, including read-only or rewriteable or volatile or non-volatile storage medium, such as in the form of virtual disk in physical memory or internal Dynamic Random Access Memory or hard disk or solid state flash disk or Read Only Memory, or read only or rewriteable CD/DVD/HD-DVD/Blu-Ray DVD or hardware chip or chipset etc.; the executable code being in the form of Polymorphic Executable (PE) or Executable with Unexecutable Code (EUC) or Polymorphic Executable with Unexecutable Code (PEUC) or Polymorphic Operating System (POS) containing PE, EUC and PEUC runnable in an authenticated or authorized state for the protection of intellectual property.

35 Claims, 6 Drawing Sheets

|  | Runnable in general - purpose computing environment 1 | Runnable in general - purpose computing environment 2 |
|---|---|---|
| General Code Section 214 | 01010101<br>01010101<br>01010101<br>01010101 | 01010101<br>01010101<br>01010101<br>01010101 |
| Polymorphic Code Section 216 | 11011011<br>01101101<br>10110110<br>11011011<br>01101101<br>10110110 | 10110101<br>01101011<br>10101101<br>01110110<br>10111010<br>11011101 |

|                                    | Polymorphic<br>Executable<br>(before conversion) | Executable with<br>Unexecutable Code<br>(after conversion) |
|------------------------------------|:-:|:-:|
| General Code<br>Section 414 | 01010101<br>01010101<br>01010101<br>01010101 | 01010101<br>01010101<br>01010101<br>01010101 |
| Polymorphic Code<br>Section 416 | 11011011<br>01101101<br>10110110<br>11011011<br>01101101<br>10110110 | 00000000<br>00000000<br>00000000<br>00000000<br>00000000<br>00000000 |
|                                    | 417 | 418 |

FIG. 4

|  | Polymorphic Executable (before conversion) | Polymorphic executable with Unexecutable Code (after conversion) |
|---|---|---|
| General Code Section 614 | 01010101<br>01010101<br>01010101<br>01010101 | 01010101<br>01010101<br>01010101<br>01010101 |
| Polymorphic Code Sections 616 | 11011011<br>01101101 617<br>10110110 | 00000000<br>00000000 618<br>00000000 |
|  | 11011011<br>01101101<br>10110110 | 11011011<br>01101101<br>10110110 |

FIG. 6

FROM POLYMORPHIC EXECUTABLE TO POLYMORPHIC OPERATING SYSTEM

TECHNICAL FIELD

This invention relates to the protection of intellectual property, such as executable code, for running in device(s), including computer system(s) or computer-controlled device(s) or operating-system-controlled device(s) or system(s) that is/are capable of running executable code. Such device(s) is/are mentioned hereafter as Device(s).

In particular, this invention relates to the method of creation, distribution and execution in Device(s) of executable code, such as boot code, programmes, applications, device drivers, or a collection of such executables constituting an operating system in the form of executable code embedded or stored into hardware, such as embedded or stored in all types of storage medium, including read-only or rewriteable or volatile or non-volatile storage medium (referred hereafter as the Storage Medium) in the form of virtual disk in physical memory or internal DRAM (Dynamic Random Access Memory) or hard disk or solid state flash disk or ROM (Read Only Memory), or read-only or rewriteable CD/DVD/HD-DVD/Blu-Ray DVD or hardware chip or chipset etc.; this invention being a method, capable of being implemented in executable instructions or programmes in Device(s), providing for running executable code in Device(s) in the form of Polymorphic Executable (PE) or Executable with Unexecutable Code (EUC) or the hybrid of these two, Polymorphic Executable with Unexecutable Code (PEUC), or Polymorphic Operating System (POS) containing PE, EUC and PEUC in an authenticated or authorized state.

In this relation, it makes possible, in Device(s) capable of executing executable code, the phenomenon of executing PE, EUC and PEUC as well as POS in an authenticated or authorized state for the purpose of protecting intellectual property.

BACKGROUND ART

United States Patent Application No, 20050210274, entitled "Apparatus and method for intellectual property protection using the microprocessor serial number", describes a method for the creation, distribution and execution of software programmes with the use of apparatuses specially designated for encryption and decryption of the software programmes, using at least a part of a serial number or other identifying number stored in a processing unit as the encryption key, the processing unit being the execution environment for decrypting the encrypted software programmes before and then executing the software programmes thus decrypted.

Protection of intellectual property for software programmes or executable code is the creation, distribution and execution of software programmes with the use of apparatuses specially designated for encryption and decryption of the software programmes, using at least a part of a serial number or other identifying number stored in a processing unit as the encryption key, the processing unit being the execution environment for decrypting the encrypted software programmes before and then executing the software programmes thus decrypted.

Protection of intellectual property for software programmes or executable code is essential for innovation and the advance of society based on intellectual activities. Therefore there have been numerous efforts or methods designed for protecting the value of intellectual activities represented in software programmes or executable code; including the use of checking for correct password, checking for encrypted digital key file, checking for signature provided in hardware, checking for correct password through activation procedure over internet, etc. The use of such methods however is either easily bypassed or requires the deployment of specially designed hardware. These methods therefore are either simply ineffective or adding hardware costs and not suiting to general-purpose computing or processing environment.

The problem encountered in the efforts for protecting intellectual activities expressed in the form of software programmes or executable code is therefore how such software programmes or executable code can be prevented from being simply copied or hacked and then executed in a general-purpose computing or processing environment. Uniquely identifiable information, such as a serial number or its derivative, retrieved from hardware used as a key for encryption/decryption of software programmes or executable code with hardly breakable or unbreakable algorithm can be a solution safeguarding such intellectual activities against those simple yet effective pirating activities involving copying and simple hacking.

The patent application mentioned above is such an attempt for solving the problem. This however involves the use of specially designed apparatuses for such purpose that does not constitute a general-purpose computing or processing environment and the decryption procedure and the decrypted software programmes stored in the designed execution environment can also be copied out and pirated by people gaining access to such environment. So such environment has to be a highly secured environment, not to be accessed by the ordinary users, customers or clients of the general mass. In the way described in the aforesaid patent application, the encrypted software programmes cannot run without being decrypted; and for the encrypted software programmes to be executable, they have to be decrypted before they are run so that the decrypted software programmes are simply executables which can be copied and runnable in any machines on the same architectural computing or processing platform with a processing unit provided with any serial number. The decrypted software programmes therefore simply become unprotected executables having all functionalities in an unencrypted form that can simply be copied and run without the need of even simple hacking.

SUMMARY OF THE PRESENT INVENTION

Technical Problem

The technical problem therefore boils down to how software programmes or executable code can be represented in polymorphic forms that are different and yet runnable in different authenticated or authorized states, but unrunnable (for the features contained in the Polymorphic Code Section(s) as described below) in unauthenticated or unauthorized states in a general-purpose computing or processing environment so that intellectual property contained in such software programmes or executable code can be best protected. So the software programme or the executable code should be an executable, in an executable format, runnable in Device(s) in the general-purpose computing or processing environment, containing polymorphic code that is unique, different as well as runnable in different authenticated or authorized states; and such polymorphic code containing features or functionalities being unrunnable or un-accessible in unauthenticated or unauthorized states.

These and other objectives, features, and advantages of the present invention will become apparent from the following detailed description, the accompanying drawings, and the appended claims.

BRIEF DESCRIPTION OF THE DRAWINGS

FIG. 4 depicts a structure of an Executable with Unexecutable Code (EUC) having a General Code Section and a EUC Section, in accordance with an embodiment of the disclosure.

FIG. 6 depicts a structure of a Polymorphic Executable with Unexecutable Code (PEUC) having a General Code Section and a Polymorphic Code Section including an Unexecutable Code (EUC) Section, in accordance with an embodiment of the disclosure.

DETAILED DESCRIPTION OF THE PREFERRED EMBODIMENT

Technical Solution

Figure 1:
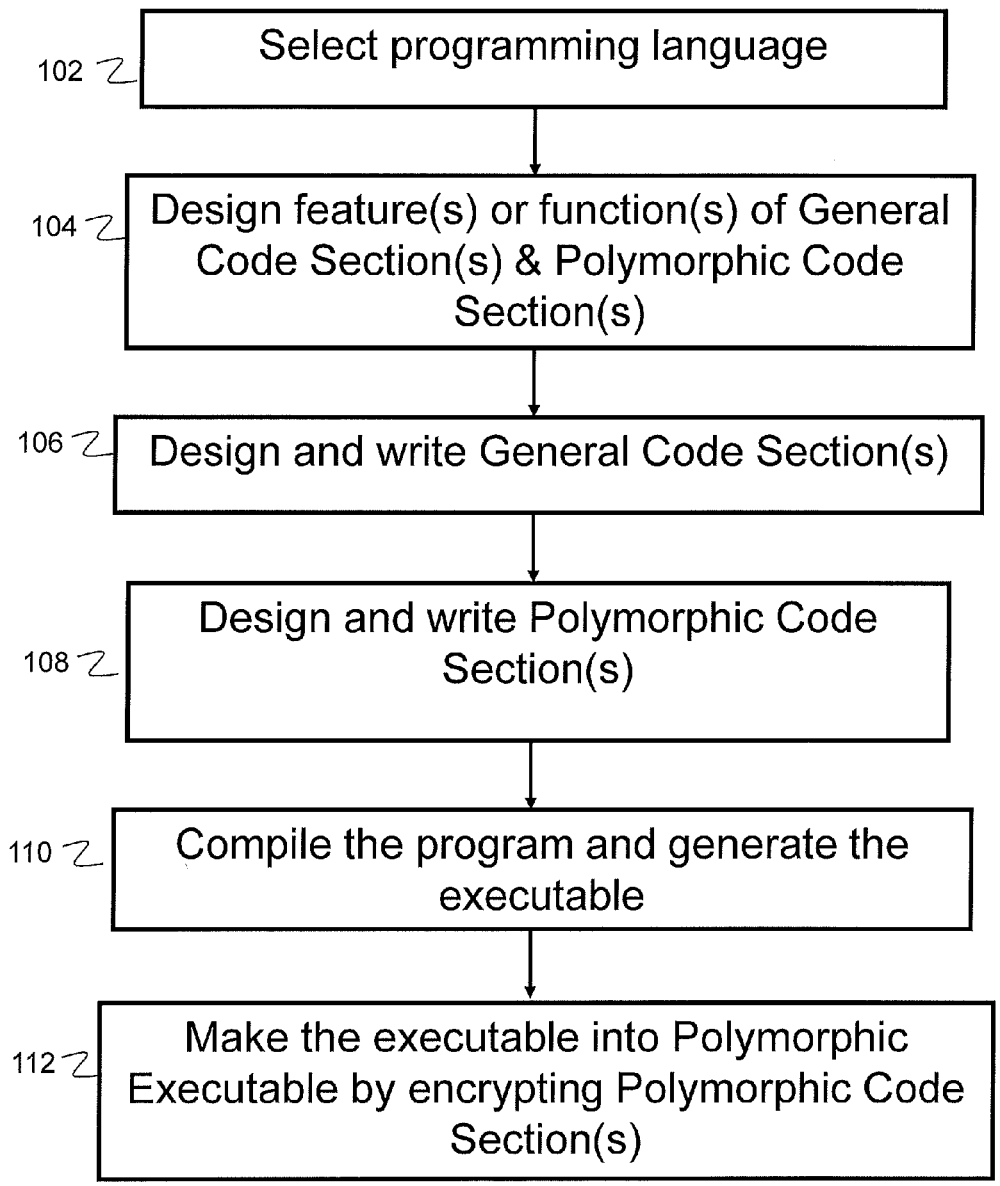
FIG. 1 is a flowchart depicting steps of a method for making a Polymorphic Executable (PE), in accordance with an embodiment of the disclosure.

Simply put, the technical solution to the technical problem described above is to represent the executable code to be protected in the form of Polymorphic Executable (PE). Conventionally, an Executable is a body of executable code that can be loaded up in Device(s) and can execute or can be executed. In view of this invention, the definition of an Executable can be further refined as being a body of code that can be loaded up in Device(s), at least some part of which can execute or can be executed. A PE, being a subset of an Executable, is unique and different and yet runnable in different authenticated or authorized states; but the Polymorphic Code Section(s) (and the features or functionalities therein) contained within a PE is/are unexecutable in unauthenticated or unauthorized states in Device(s) in a general-purpose computing or processing environment. So the code in Polymorphic Code Section(s) is encrypted unexecutable code when not in use, and this encrypted unexecutable code is different before it is decrypted for running in different authenticated or authorized states; and it is decrypted into executable code while the PE is running for its successful execution in the general-purpose computing or processing environment, performing the same function(s) as intended in the same authenticated or authorized states.

The Polymorphic Code Section(s) in a PE is/are therefore best generated by hardly breakable or unbreakable algorithm(s) of encryption/decryption; i.e. an encryption procedure with a corresponding decryption procedure of hardly breakable or unbreakable algorithm(s). And what encryption/decryption algorithm(s) to be used is/are a matter of choice and can be updated with the advance of cryptographic science.

So a PE is in an executable format that can be executed or run in Device(s) in a general-purpose computing or processing environment of any architectural hardware platform. In this format, a PE has the following sections:

(A) General Code Section(s)

The General Code Section(s) contain(s) executable code in an unencrypted format that is executable without the need for encryption/decryption. The General Code Section(s), amongst performing other functionalities, contain(s):

Retrieving Function(s) (RF), function(s) for retrieving, whether locally or through local network or internet, identifying information or identifier(s) from the general-purpose computing or processing environment for use in the Decrypting Function(s) (DF) in also the General Code Section(s), and Decrypting Function(s), which use(s) the identifying information or identifier(s) retrieved by the RF for decrypting the Polymorphic Code Section(s) corresponding to the Encryption Function(s) (EF) used for encrypting the Polymorphic Code Section(s).

So there can be more than one pair of encryption/decryption algorithm used.

Different Polymorphic Code Section(s) can be decrypted with different DF corresponding to different EF used for its/their encryption.

Depending on need, the General Code Section(s) may also contain Exception Function(s) (ExF), which handle(s) exception(s) when the code of the Polymorphic Code Section(s) after being decrypted and placed back into the corresponding location in the system memory image of the PE (i.e. where the PE is loaded in the system memory) is not executable. For instance, the DF may call the the ExF after decrypting the corresponding Polymorphic Code Section(s) and placing the resulted code into the corresponding location in the system memory image of the PE. The ExF may then perform some verification activities, such as processing the corresponding decrypted Polymorphic Code Section(s) to determine whether the resulted code in the corresponding location in the system memory image of the PE is in the executable format as the code in the General Code Section(s). For example, the ExF may initiate other error-handling activities, such as reporting errors or doing preparation for exiting and closing down the PE nicely if a certain signature is not found in the decrypted code. Such signature may be a checksum calculated from the Polymorphic Code Section execution code, or some other static data of choice appended to the beginning or the end of the Polymorphic Code Section(s) or inserted somewhere therein. And if after decryption, such signature is not correct, then the ExF may initiate other error-handling activities. If the signature is correct, the ExF does action that initiates the execution of the corresponding decrypted code.

The functionalities of ExF so described may also be incorporated in DF, so separate ExF may not be necessary. ExF or such ExF functionalities as incorporated in DF are optional.

(B) Polymorphic Code Section(s)

Polymorphic Code Section(s) contain(s) encrypted code for those features or functions of intellectual activities to be protected. The encrypted code in the Polymorphic Code Section(s) is to be decrypted for execution by the DF corresponding to the EF that is used for encrypting the code.

Upon execution, the PE is loaded up into the system memory and is executed. The General Code Section(s) of the PE in the system memory contain(s) executable code for execution in Device(s) in the general-purpose computing or processing environment without the need for decryption. For running the encrypted code in the Polymorphic Code Section(s), which are not executable as they are in encrypted format, the RF in the General Code Section(s) is executed and the RF passes the identifying information or identifier(s) retrieved from the general-purpose computing or processing environment to DF for use for decrypting the encrypted code of the corresponding Polymorphic Code Section(s).

The DF, after decrypting the encrypted code of the corresponding Polymorphic Code Section(s), places back the decrypted code into the corresponding location in the system memory image where the PE is loaded up.

So if the general-purpose computing or processing environment at the time is in an authenticated or authorized state, the decrypted code should be in the right executable format as the same as the code in General Code Section(s). So they can be executed correctly. The ExF or such ExF functionalities as incorporated in DF may first do the error-handling activities to determine whether to initiate action to execute the decrypted code or not as described above.

An authenticated or authorized state is a state in which the identifying information or identifier(s) as retrieved by the RF from the general-purpose computing or processing environment can be and is used by the DF to produce the decrypted code that is executable and performs the features or functionalities that are originally so designed. That is the encrypted code is rightly decrypted with the use of the identifying information or identifier(s) retrieved by the RF and passed to the DF for decryption for successful execution. An unauthenticated or unauthorized state is a state in which the identifying information or identifier(s) as retrieved by the RF from the general-purpose computing or processing environment, after being used by the DF, cannot yield decrypted code that is executable and the resulted code after decryption does not perform successfully the features or functionalities that are originally so designed. That is, the encrypted code is not rightly decrypted with the use of such identifying information or identifier(s) as retrieved by the RF and passed to the DF. In this case, the DF does not produce the right code for execution as originally designed.

The identifying information or identifier(s) retrieved by the RF can be, but not limited to, the serial number(s) or the derivative(s) of such serial numbers of the Central Processing Unit(s) or a particular piece of hardware or a combination of pieces of hardware as found within or accessible to the general-purpose computing or processing environment through network including local network and internet. This identifying information or identifier(s) is/are unique to the purpose for which it is or they are intended; for examples, such as unique in identifying a certain piece or a certain set or class of equipment produced by a manufacturer, or for identifying a certain manufacturer for all the equipment it makes. It can also be an identifier of an individual person or a target group of persons, such as fingerprint or any other biometric information that can be obtained from that individual person or a target group of persons through the general-purpose computing or processing environment, whether networked or not. Such identifying information or identifier(s) of course has/have to be made accessible for the purpose of encryption in the stage for making a PE. This access of identifying information or identifier(s) for encryption purpose can be by transmission over local network or internet or through ordinary mails or by other means of transmission or other ways of delivery or distribution; such identifying information or identifier(s) is/are therefore to be transmitted from the general-purpose computing or processing environment where it is/they are collected and intended for use by the PE under concern to where it is/they are used for encryption for making the PE under concern.

Such identifying information or identifier(s) collected from the general-purpose computing or processing environment for being used as a key for the purpose of applying encryption/decryption on the Polymorphic Code Section under concern, as will be described below, is/are best to be omitted in the encryption/decryption key holder within the Polymorphic Code Section for the best protection of the PE. If to be placed there, such identifying information or identifier(s) is/are best to be encrypted by using an encryption/decryption routine where the decryption routine for the purpose of decrypting such identifying information or identifier(s) should be made available, during the running of the PE, for decrypting such identifying information or identifier(s), which after decryption can then be used for decrypting the rest of the Polymorphic Code Section under concern.

Furthermore, instead of using such identifying information or identifier(s) collected from the general-purpose computing or processing environment as the encryption/decryption key, some other identifying information or identifier(s) can be supplied, during the encryption process or during the PE is in actual running, for being used as the encryption/decryption key for the encryption/decryption processing of the Polymorphic Code Section under concern. This type of "supplied" identifying information or identifier(s) is distinguished from the type of "collected" identifying information or identifier(s) in the sense that the "collected" type is usually static information or identifier(s) that the PE, while running, can collect by itself, such as the hardware serial numbers of the Device in which the PE is running. The "supplied" type is usually dynamic information or identifier(s) that has/have to be supplied to the PE by dynamic user input when the PE is running, such as the password emailed to the registered user by the maker of the PE, or the fingerprint of the registered user, or the digital key file passed over internet to the Device and supplied to the PE for use while the PE is running, or a combination of these.

In addition, such other identifying information or identifier(s) so supplied can also be used together with the identifying information or identifier(s) collected from the general-purpose computing or processing environment as the encryption/decryption key. All such identifying information or identifier(s), or either type of the "collected" or "supplied" identifying information or identifier(s) alone, can be placed or omitted in the encryption/decryption key holder within the Polymorphic Code Section. If to be so placed, as mentioned earlier, for the best protection, such all identifying information or identifiers is/are best to be encrypted by using an encryption/decryption routine where the decryption routine for the purpose of decrypting such identifying information or identifier(s) should be made available, during the running of the PE, for decrypting such identifying information or identifier(s), which after decryption can then be used for decrypting the rest of the Polymorphic Code Section under concern.

And whether to place all or part of such identifying information or identifier(s) or not to place altogether in the encryption/decryption key holder within the Polymorphic Code Section and whether such identifying information or identifier(s) if so placed is/are to be further encrypted/decrypted is up to the designer or maker of the PE according the purpose for which the PE is intended, the environment in which the PE is run and the degree of security and protection that the PE is intended to attend and achieve.

How a PE in an executable format can be produced is illustrated by the following implementation steps and examples. The implementation steps and examples described outline in a broad way the method by which the PE is to be designed, programmed and Polymorphic-Section-encrypted. People skilled in the art can make similar implementation with slight variations of their choice and design.

When the executable is written, it is not known where the executable will be loaded up in the system memory in runtime. Memory references to static variables of the executable are stored as offsets to the beginning of the run-time image. The executable contains a special section called relocation table that has pointers to these offsets. When the executable is loaded, the operating system will automatically add the runtime load address of the executable to these offsets, so that the memory references will be valid. However if such relocation, i.e. adding the run-time load address to offsets described above, occurs to a Polymorphic Code Section upon loading, it will destroy the integration of code and render it unexecutable after decryption. Therefore, such relocation must be eliminated in Polymorphic Code Section.

Below is a description of how to achieve this (i.e. to eliminate such relocation by using other programming techniques instead of those techniques which would have made such relocation) using the C programming language, the same principle applies to using other programming languages as well.

(a) Avoid making memory reference to global variable in Polymorphic Code Section. For example, the following function is not to be included in a Polymorphic Code Section.

```
int global_variable;
// Polymorphic Code Section starts here
int foo( )
{
return global_variable;
}
// Polymorphic Code Section ends here
```

(b) Avoid making memory reference to static local variable in Polymorphic Code Section. For example, the following function is not to be included in a Polymorphic Code Section.

```
// Polymorphic Code Section starts here
int foo( )
{
static int static_variable;
return static_variable;
}
// Polymorphic Code Section ends here
```

(c) Avoid using static string in Polymorphic Code Section. For example, the following function is not to be included in a Polymorphic Code Section.

```
// Polymorphic Code Section starts here
char* foo( )
{
return "Hello, world";
}
// Polymorphic Code Section ends here
```

(d) Avoid using pointers to function or global variable in Polymorphic Code Section. For example, the following referencing is not to be included in a Polymorphic Code Section.

```
int global_variable;
void foo1O
{
}
// Polymorphic Code Section starts here
void foo2( )
{
}
int foo3( )
{
void *p1,*p2,*p3;
p1=&foo1;
p2=&foo2;
p3=&global_variable;
}
// Polymorphic Code Section ends here
```

In fact, it is possible to achieve the intended result of the above functions, as revealed by this invention, through using a wrapper function which is to be placed in the General Code Section(s) outside the Polymorphic Code Section under concern. For example, the following ways of coding are valid, where (e) to (h) correspond to (a) to (d) respectively:

(e) Instead of making memory reference to global variable in Polymorphic Code Section, one can make memory reference to global variable with wrapper.

```
int global_variable;
int global_variable_wrapper( )
{
return global_variable;
}
// Polymorphic Code Section starts here
int fooO
{
return global_variabke_wrapper( );
}
// Polymorphic Code Section ends here
```

(f) Instead of making memory reference to static local variable in Polymorphic Code Section, one can replace static local variable with global variable, and use the method described in (e) above in making such memory reference.

(g) Instead of using static string in Polymorphic Code Section, one can use static string with wrapper.

```
char* static_string_wrapper( )
{
return "Hello, world";
}
// Polymorphic Code Section starts here
char* foo( )
{
return static_string_wrapper( ) ;
}
// Polymorphic Code Section ends here
```

(h) Instead of using pointers to function or global variable in Polymorphic Code Section, one can use pointers to function or global variable with wrapper.

```
int global_variable;
void foo1O
{
}
```

-continued

```
void foo2( ) ; // Forward declaration
void* function_pointer_wrapper1 ( )
{
return &foo1;
}
void* function_pointer_wrapper2( )
{
return &foo2;
}
void* global_variable_pointer wrapper( )
{
return &global_variable ;
}
// Polymorphic Code Section starts here
void foo2( )
{
}
int foo3( )
{
void *p1,*p2,*p3;
pi =function_pointer wrapper 1 ( ) ;
p2=function_pointer_wrapper2( );
p3=global_variable_pointer_wrapper( ) ;
}
// Polymorphic Code Section ends here
```

Figure 2:
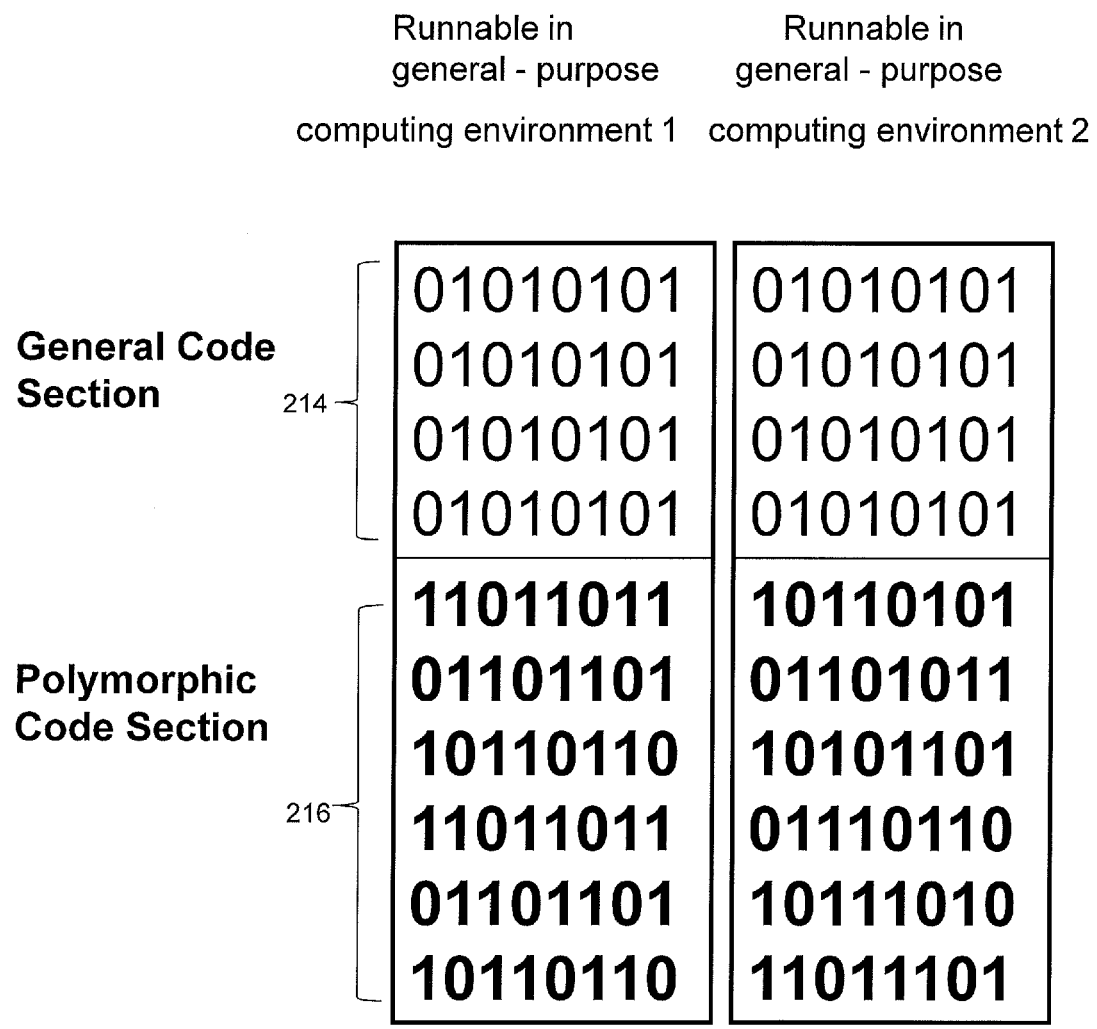
FIG. 2 depicts a structure of a Polymorphic Executable (PE) including a General Code Section and a Polymorphic Code Section, in accordance with an embodiment of the disclosure.

The coding and encryption process for making a Polymorphic Executable (PE) is depicted in flowchart 100 of FIG. 1 and is described as follows with reference to the steps of flowchart 100 and the PE shown in FIG. 2 including a General Code Section 214 and a Polymorphic Code Section 216:

(1) In step 102, select the programming language of choice for writing the PE;

(2) In step 104, decide and design what feature(s) or function(s) is/are to be included in General Code Section(s) or in Polymorphic Code Section(s) such as the exemplary General Code Section 214 and Polymorphic Code Section 216 depicted in FIG. 2 (in embodiments, the General Code Section 214 is unencrypted and the same and runnable for general-purpose environments and the encrypted, different for different general-purpose environments, and the Polymorphic Code Section 216 is runnable in an authenticated environment);

(3) In step 106, design and write General Code Section(s) as normally would be written for normal code which does not require encryption/decryption, such as the exemplary General Code Sections 214, 414 and 614 shown in FIGS. 2, 4 and 6 (in embodiments, the General Code Sections 214, 414, and 614 are unencrypted and the same and runnable for general-purpose environments), and, if and where necessary, incorporating changes or revisions resulting from the need for providing for the writing of Polymorphic Code Section(s) according to the rules mentioned above and reproduced as in (4) a) to (4) d) below;

(4) In step 106, design and write Polymorphic Code Section(s) according to the rules mentioned above and reproduced as follows:

(4) b) Instead of making memory reference to static local variable in Polymorphic Code Section, replacing static local variable with global variable, and using the step described in (4) a) in making such memory reference;

(4) c) Instead of using static string in Polymorphic Code Section, using static string with wrapper;

(4) d) Instead of using pointers to function or global variable in Polymorphic Code Section, using pointers to function or global variable with wrapper;

(5) Add a Polymorphic Code Section Header function with a Polymorphic Code Section Header at the beginning of Poly morphic Code Section(s) when writing the programme. The header contains:

(5) a) at least a header signature holder for holding a header signature. This holder and the header signature to be placed within should be long enough so that the header signature used can be easily distinguished and identified and will not be easily mistaken for normal execution code. For instance, a One-Byte header signature may be easily mistaken as normal execution code and may not be long enough for the purpose of clear-cut identification. The programme designer or maker can select a signature of choice for the header signature so that the PE can easily identify where the Polymorphic Code Section begins. This header signature is used for identifying where the encryption/decryption of the Polymorphic Code Section should begin. During the encryption process for making the PE, this header signature is used for making encryption of the Polymorphic Code Section. For the best protection, after encryption, this header signature can be scrambled at random or encrypted to prevent the Polymorphic Code Section from being easily located by hackers. However it is optional to scramble at random or encrypt it or not, depending on the purpose, the degree of security and protection that programme designer or maker wants to achieve. This header signature is not necessary for the PE, while executing, for identifying where the Polymorphic Code Section begins as the PE can know this by making reference to the Polymorphic Code Section Header function instead.

(5) b) The encryption/decryption key holder for holding the identifying information or identifier(s) for encryption/decryption key. This holder can be omitted if the encryption/decryption key contains only the identifying information or identifier(s) collected or supplied from the general-purpose computing or processing environment as mentioned above. If the encryption/decryption key holder contains identifying information or identifier(s), whether collected or supplied from the general-purpose computing or processing environment or supplied in the process of making and encrypting the PE, to be used for the encryption/decryption process, this holder should be long enough to hold such identifying information or identifier(s) as intended. If not omitted, this encryption/decryption key holder together with such identifying information or identifier(s), whether encrypted or not, should be placed just ahead of the header signature holder at (5) a) above; i.e. it is to be placed at the beginning of the Polymorphic Code Section. Such identifying information or identifier(s) placed in the encryption/decryption key holder can be unencrypted. Or if it is to be encrypted in the encryption process and decrypted for use for decrypting the Polymorphic Code Section under concern, such encryption/decryption should be done by using an encryption/decryption routine where the decryption routine for this purpose should be made available, during the running of the PE, for decrypting such identifying information or identifier(s), which after decryption can then be used for decrypting the rest of the Polymorphic Code Section under concern.

(5) c) The error-checking signature holder for holding the error-checking signature for the purpose of checking whether the decrypted code is executable. The checksum calculated from the unencrypted executable code of the Polymorphic Code Section can be used for such purpose. And if such checksum is used, it is to be placed here before the Polymorphic Code Section is encrypted and goes through the encryption/decryption process as the rest of the Polymorphic Code Section as a whole. This holder may also contain some other static data of choice as described above for use in ExF error handling. This holder can be omitted if error-checking is not to be done.

(6) Add a Polymorphic Code Section Footer function with a Polymorphic Code Section Footer at the end of the Polymorphic Code Section(s). The footer contains a footer signature holder for holding a footer signature. This holder and the footer signature to be placed within should be long enough so that the footer signature used can be easily distinguished and identified and will not be easily mistaken for normal execution code. For instance, a One-Byte footer signature may be easily mistaken as normal execution code and may not be long enough for the purpose of clear-cut identification. The programme designer or maker can select a signature of choice for the footer signature so that the PE can easily identify where the Polymorphic Code Section ends. This footer signature is used for identifying where the encryption/decryption of the Polymorphic Code Section should end. During the encryption process for making the PE, this footer signature is used for making encryption of the Polymorphic Code Section. For the best protection, after encryption, this footer signature can be scrambled at random or encrypted to prevent the Polymorphic Code Section from being easily located by hackers. However it is optional to scramble at random or encrypt it or not, depending on the purpose, the degree of security and protection that programme designer or maker wants to achieve. This footer signature is not necessary for the PE, while executing, for identifying where the Polymorphic Code Section ends as the PE can know this by making reference to the Polymorphic Code Section Footer function instead.

(7) In step 110, compile the programme, and generate the executable for the platform of general-purpose computing or processing environment in which the executable is intended to be run.

(8) In step 112, use the executable generated in (7) or make a copy of such executable for such purpose, if necessary, and run an encryption programme of choice for encrypting such executable or its copy respectively. This encryption process can be done using as many and different encryption/decryption keys for as many and different authenticated or authorized states as required. It does the following process in sequence:

(8) a) Scan the executable for the Polymorphic Code Section Header and Polymorphic Code Section Footer signatures of the Polymorphic Code Section(s) to determine where the encryption of the Polymorphic Code Section(s) begin(s) and end(s).

(8) b) For each Polymorphic Code Section found, calculate the checksum, and fill it into the error-checking signature holder field of the Polymorphic Code Section Header. The checksum is calculated from the executable code of the Polymorphic Code Section, excluding information contained within the encryption/decryption key holder, the header signature holder, the footer signature holder and the error-checking signature holder, if any. After calculating this checksum in this way, the checksum is placed into the error-checking signature holder and is encrypted together for its protection also with the rest of the Polymorphic Code Section under concern except the encryption/decryption key holder, if any. If checksum is not used for such error-checking purpose and some other static data of choice is to be used for such purpose, such other static data has to be placed into the error-checking signature holder and is encrypted likewise with the rest of the Polymorphic Code Section under concern. This step can be omitted if checking is not intended to be done.

(8) c) Encrypt the Polymorphic Code Section(s), using the encryption/decryption algorithm(s) of choice and using, as the encryption/decryption key, the identifying information or identifier(s) supplied, if any, by the programme designer or maker of the Polymorphic Code Section(s), and/or the identifying information or identifier(s) collected from the Device(s) in the general-purpose computing or processing environment and/or other identifying information or identifier(s) as supplied by the user for the encryption/decryption purpose through all means of transmission or delivery, including transmission over local network or internet or through ordinary mails or by other means of transmission or other ways of delivery or distribution. If the encryption/decryption key holder at the Polymorphic Code Section Header is omitted so that the identifying information or identifier(s) intended to be used as the encryption/decryption key is/are to be best protected, such identifying information or identifier(s) should be made available for encryption/decryption purpose and be collected from the general-purpose computing or processing environment or so supplied while the PE is in actual running. If the encryption/decryption key holder exists, the above mentioned identifying information or identifier(s) or part of which is/are then placed, according to the design of the PE or the purpose for which the PE is designed, into the encryption/decryption key holder at the Polymorphic Code Section Header. As mentioned earlier, the checksum, if any, should be encrypted as well so that it is not to be modified easily. After encryption, for the best protection, the header signature and footer signature should be scrambled or encrypted again so that these signatures are not to be or cannot be used for locating the Polymorphic Code Section(s) in the PE after encryption. However it is optional to scramble at random or encrypt these signatures or not, depending on the purpose, the degree of security and protection that programme designer or maker wants to achieve. The encryption/decryption key in the encryption/decryption key holder can be:

(8) c) i) containing only the identifying information or identifier(s) collected or supplied from the general-purpose computing or processing environment as mentioned above. If so contained, such identifying information or identifier(s) is/are best to be encrypted; or (8) c) ii) containing some other identifying information or identifier(s) so supplied in the process of making or encrypting the PE, such as a random number or an identifier of the version number of the PE or the identifier of the maker of the PE, etc. If so contained, such identifying information or identifier(s) is/are best to be encrypted; or (8) c) iii) containing the identifying information or identifier(s) of (8) c) i) and (8) c) ii). If so contained, such identifying information or identifier(s) is/are best to be encrypted; or (8) c) iv) omitted if the identifying information or identifier(s) intended to be used as the encryption/decryption key is/are to be best protected, provided such identifying information or identifier(s) can be collected for encryption/decryption purpose from the general-purpose computing or processing environment or so supplied while the PE is in actual running.

So in the implementation of the method revealed in this invention, each Polymorphic Code Section is marked by a Polymorphic Code Section Header function in the beginning and by a Polymorphic Code Section Footer at the end. It begins with the encryption/decryption key holder, if any. If no encryption/decryption key holder, the Polymorphic Code Section begins at the Polymorphic Code Section Header signature holder. The normal encryption/decryption processing, i.e. excluding the encryption/decryption key if any, of the Polymorphic Code Section begins after the encryption/decryption key holder, if any, and begins at the Polymorphic Code Section Header signature holder and ends at and includes the Polymorphic Code Section Footer signature holder. As mentioned earlier, the encryption/decryption key, if any, for the Polymorphic Code Section is placed outside and ahead of the rest of the Polymorphic Code Section. The rest of the Polymorphic Code Section undergoes the normal encryption/decryption process, whereas the encryption/decryption key, if any, does not. The encryption/decryption key, if any, is either unencrypted; or encrypted/decrypted as described earlier above by using an encryption/decryption routine where the decryption routine for this purpose should be made available, during the running of the PE, for decrypting the encryption/decryption key, which after decryption can then be used for decrypting the rest of the Polymorphic Code Section under concern.

People skilled in the art may design implementation variations that can achieve the same effects according to the ideas of the method revealed in this invention. For instance, as mentioned earlier, it is optimal to have the encryption/decryption key holder and the error-checking signature holder in the Polymorphic Code Section Header or these two holders can be designed to be placed within the Polymorphic Code Section Footer instead. The error-checking and exception handling activities as embodied in ExF or in DF is also optional, depending whether such handling is required or not. Or People skilled in the art may do away with the use of Polymorphic Code Section Header function and Polymorphic Code Section Footer function altogether and design some other ways of identifying the Polymorphic Code Section(s) as long as the PE so designed can be executed and the Polymorphic Code Sections within can be identified correctly for encryption/decryption and execution purpose. In this invention later, description will also be given to implementation variations that convert a Polymorphic Executable into an Executable with Unexecutable Code or into a Polymorphic Executable with Unexecutable Code.

The running of the PE and the related decryption process is described as follows:

(9) When the PE is loaded, the Polymorphic Code Section(s) is/are loaded into memory just like normal code.

(10) When the PE needs to call a function that is inside a Polymorphic Code Section. Through programme design, the PE is able to know which Polymorphic Code Section that the function is supposed to be in. Before calling a function in a Polymorphic Code Section, the PE first locates Polymorphic Code Section by referencing the location of its corresponding Polymorphic Code Section Header function and Polymorphic Code Section Footer function. Using such locational information, the PE then decrypts the Polymorphic Code Section except the encryption/decryption key holder, if any, by using the corresponding DF as follows:

(10) a) The PE must check whether the Polymorphic Code Section has been decrypted before doing decryption again. For instance, such checking can be done by implementing an encryption/decryption stack for the Polymorphic Code Section as described below in relation to multiple encryption/decryption. If the Polymorphic Code Section has been decrypted, the PE simply calls the function within the Polymorphic Code Section as intended and goes to take (10) f) below. If the Polymorphic Code Section has not been decrypted, then the PE goes to take (10) b) below;

(10) b) If there is no encryption/decryption key holder in the Polymorphic Code Section Header of the Polymorphic Code Section, the DF uses the identifying information or identifier(s) as returned by the RF from the Device in the general-purpose computing or processing environment or such identifying information or identifier(s) so supplied for the purpose when the PE is now in actual running, or both sets of such identifying information or identifier(s) altogether, as the key for decryption and goes to take (10) c) below. If there is an encryption/decryption key inside the encryption key holder, the DF extracts the encryption/decryption key from the Polymorphic Code Section Header. If the encryption/decryption key so extracted has not been encrypted, the DF goes to take (10) c) below. And if for the best protection, and if such a key has been previously encrypted, the DF decrypts the key by calling the decryption routine that corresponds to the encryption routine that has been used for encrypting the key. In some implementation, this key is only a partial key and can be used together with the identifying information or identifier(s) as returned by the RF from the Device in the general-purpose computing or processing environment or such identifying information or identifier(s) so supplied for the purpose when the PE is now in actual running, or together with both sets of such identifying information or identifier(s) altogether, as the key for decryption. The DF then continues to take (10) c) below;

(10) c) The DF decrypts the Polymorphic Code Section except the encryption/decryption key holder and the key so contained, using the key obtained in (10) b); and then continues to take (10) d) below;

(10) d) If there is an error-checking signature holder holding a checksum or an identifying signature, the DF then calculates the checksum of the executable code and compares it to the value stored in the error-checking signature holder in the Polymorphic Code Section Header or verifies whether the identifying signature is correct. If there is no match or the identifying signature is not correct, the code is corrupted and cannot be used. The DF jumps to its error handling routines or calls ExF for such purpose. If there is a match or the identifying signature is correct or if there is no an error-checking signature holder, the DF returns and the PE continues to take (10) e) below;

(10) e) The PE calls the function as it intends to call in the Polymorphic Code Section just decrypted. The PE then goes to take (10) f) below if required; if (10) f) below is not required to be taken, the function so called by the PE returns, and the PE continues with the programme logics immediately following the return of the function so called;

(10) f) If extra security is required, the function so called by the PE should call the corresponding encryption algorithm to re-encrypt the Polymorphic Code Section before it returns. Or the function simply returns without calling the corresponding encryption algorithm for re-encryption. And the PE continues with the programme logics immediately following the return of the function so called.

The implementation of the above method can be done in many programming languages and many operating systems. The programming language requirement is that the language used permits inserting raw data into the code segment, and that it permits marking a section of code. For example, in C language, raw data can be inserted into code section using inline assembly. Functions are compiled in sequence. Therefore it permits marking a section, for instance, by placing two functions, the section-header function at the beginning and the section-footer function at the end, for this purpose as described above in relation to the Polymorphic Code Section Header function and the Polymorphic Code Section Footer function. Assembly and many structure-programming-languages, such as C, C++ and Pascal, meet this requirement. The operating system requirement is that it permits executable to write to the code segment. Some operating system, like DOS, including for instances MSDOS and FreeDOS, does not protect the code segment, thus nothing needs to be done. Other operating systems such as those in the Microsoft Windows family, code segment cannot be usually written over. However, using special link options, the attribute of the code segment can be changed, making the code segment writeable.

For further improvements, encryption/decryption scheme revealed in this invention can be modified or enhanced in the following ways:

(11) One can apply multiple encryption/decryption algorithms of choice. Each section can go through multiple passes of encryption/decryption by using an encryption/decryption stack. Pushing to the stack means adding another pass of encryption, while popping from the stack means removing the outmost layer of encryption. Each section has a separate stack, which can be different to a stack that belongs to another section.

(12) At run-time, the PE can modify (push or pop) the encryption/decryption stack at will for any given Polymorphic Code Section, as long as the stack must be empty before calling a function in the section.

(13) When a call to a function inside a Polymorphic Code Section returns, the PE, if needed, can recreate the encryption/decryption stack for the section. The algorithm and/or key for the new encryption/decryption in the stack may or may not be the same as the original one.

(14) One can embed a Polymorphic Code Section inside another Polymorphic Code Section, each with its encryption/decryption stack. Depending on the level of security needed, multiple nesting or wrapping of these Polymorphic Code Sections can be implemented. Of course, to use the inner section, one must first decrypt its outer or wrapping section(s) or empty the corresponding encryption/decryption stack(s) for its outer or wrapping section(s).

(15) An encryption/decryption routine can be hidden inside a Polymorphic Code Section. Of course, to use this routine, one must first decrypt the Polymorphic Code Section using another encryption/decryption routine that is not encrypted or has been decrypted previously.

So the enhancements described above represent various methods for further protecting the function(s) or feature(s) embedded within the Polymorphic Code Section(s) of an executable. Simply put, they can be summarized as the method of applying the technique of nesting Polymorphic Code Section(s); the method of applying the technique of embedding hidden encryption/decryption algorithm(s) within nested Polymorphic Code Section(s); the method of applying the technique of implementing multiple passes of encryption/decryption; the method of applying the technique of implementing encryption/decryption with multiple encryption/decryption algorithms; as well as the method of applying the technique of implementing dynamic single pass and/or multiple passes of encryption/decryption with or without the use of stacking, that is encryption/decryption and re-encryption/re-decryption of the same Polymorphic Code Section(s) while the executable is being executed, for the creation of any executable(s) using Polymorphic Code Section(s).

Any executable or programme or executable code can be turned into a Polymorphic Executable. An operating system is a collection of executables, programmes or executable code. So any operating system can be turned into a Polymorphic Operating System consisting of its corresponding Polymorphic Executables. So this invention also applies to operating system in general, besides individual executable or programme or executable code. And a Polymorphic Operating System does not necessarily have to contain all executables in the form of Polymorphic Executables; only those functions or features that the Polymorphic Operation System is designed to protect or the small number of installation files, start-up files or crucial kernel files that help to install, activate, authenticate and start-up the Polymorphic Operation System under concern are good candidates for putting into Polymorphic Executables.

For convenience, Polymorphic Operating System is considered here an operating system made up of, in different combinations, ordinary Executables, Polymorphic Executables and the related variants. The related variants of PE are Executable with Un-executable Code (EUC) and Polymorphic Executable with Unexecutable Code (PEUC).

EUC and PEUC are better conceived as variants of PE that are used in Device(s) in the general-purpose computing or processing environment that is/are connected to network, whether local network or internet; or the executable code for replacing the unexecutable code in the Unexecutable Code Section(s) of EUC and/or PEUC is to be retrieved, whether through local network or internet, from somewhere within or accessible to the general-purpose computing or processing environment in which the corresponding EUC and/or PEUC is/are executed.

EUC is an executable containing executable General Code Section(s) with executable code and unexecutable Unexecutable Code Section(s) with unexecutable code, whether in a pattern of all zeros or all ones or in one of the patterns ranging from all zeros to all ones or in a scramble-at-random pattern. PEUC is an executable containing executable General Code Section(s) with executable code, at least one or more Polymorphic Code Section(s) with encrypted unexecutable code when not in use and decrypted executable code when in use, as well as one or more unexecutable Unexecutable Code Section(s) with unexecutable code, whether in a pattern of all zeros or all ones or in one of the patterns ranging from all zeros to all ones or in a scramble-at-random pattern. This is so with the following qualification. That is, the Unexecutable Code Section(s) of EUC or PEUC may however contain some matching information (superimposed on the pattern described above) between the the encrypted Polymorphic Code Section(s) and the corresponding Unexecutable Code Section(s) for identifying where the Unexecutable Code Section(s) is/are located for its/their replacement by its/their corresponding encrypted Polymorphic Code Section(s) while the EUC or PEUC is running if the locational information, about where the encrypted Polymorphic Code Section(s) begin(s) or end(s) in the corresponding PE, is not or has not been saved or stored with the corresponding encrypted Polymorphic Code Section(s) to be saved or stored in the server or computer or machine or device administering such encrypted Polymorphic Code Section(s) and the corresponding locational information for the purpose of delivering or transmitting such encrypted Polymorphic Code Section(s) and the corresponding locational information for use later by the EUC or PEUC running Device(s).

The unexecutable code in the Unexecutable Code Section(s) of EUC and PEUC is to be replaced, while the EUC and PEUC are executing, by the corresponding Polymorphic Code Section(s) with encrypted unexecutable code when not in use and decrypted executable code when in use for the successful execution of EUC and PEUC in the general-purpose computing or processing environment in authenticated or authorized states. For receiving the corresponding Polymorphic Code Section(s) and the corresponding relational information, if any, for replacing the corresponding Unexecutable Code Section(s), the EUC or the PEUC should have function(s) for such purpose; that is for the purpose of receiving the corresponding Polymorphic Code Section(s) and the corresponding relational information and replacing the Unexecutable Code Section(s) by the corresponding Polymorphic Code Section(s). If the corresponding relational information for the corresponding Polymorphic Code Section(s) is not available, the EUC or the PEUC should have also function(s) for identifying where the corresponding Polymorphic Code Section(s) should go for replacing the Unexecutable Code Section(s). Such function(s) or functionalities can be placed in the General Code Section(s), for instance either separately as separate function(s) or incorporated into the Retrieving Function(s) (RF) or Decrypting Function(s) (DF) therein, or made available for use when such function(s) have to be used for the aforesaid purposes.

Figure 3:
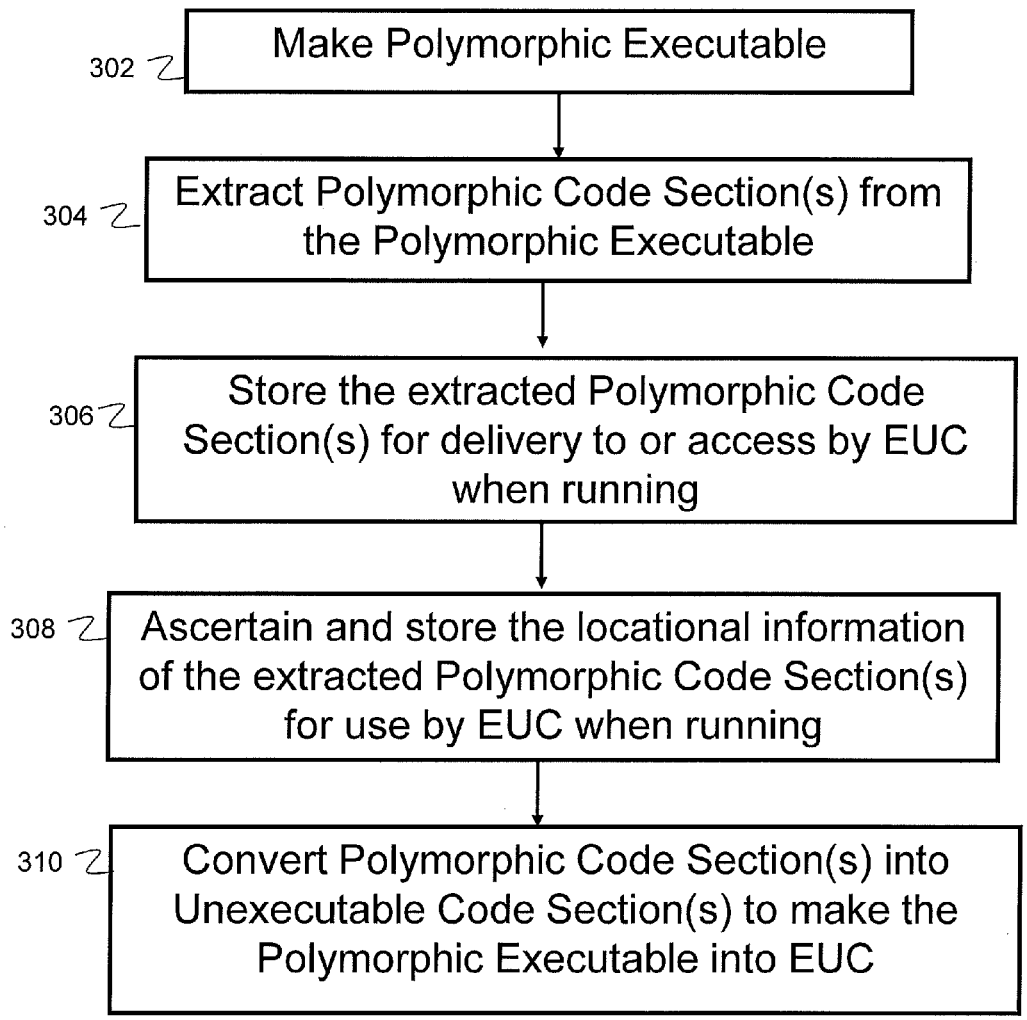
FIG. 3 is a flowchart depicting steps of a method for making an Executable with Unexecutable Code (EUC), in accordance with an embodiment of the disclosure.
Figure 5:
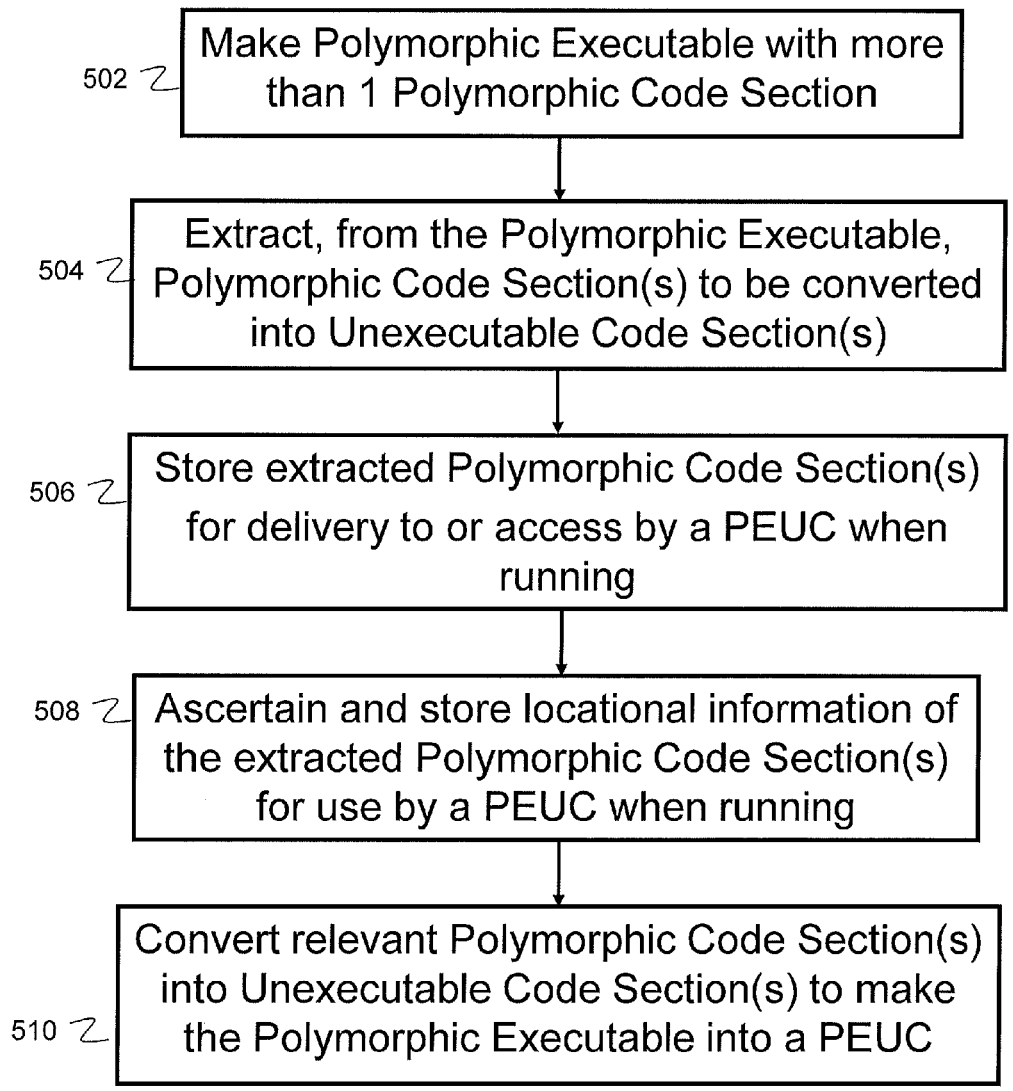
FIG. 5 is a flowchart depicting steps of a method for making a Polymorphic Executable with Unexecutable Code (PEUC), in accordance with an embodiment of the disclosure.

The process of creating an EUC or a PEUC is depicted in flowcharts 300 and 500 of FIGS. 3 and 5, respectively, and is described as follows with reference to the steps of flowcharts 300 and 500, the Polymorphic Code Sections 416 and 616 of FIGS. 4 and 6, and the Unexecutable Code Sections 418 and 618 shown in FIGS. 4 and 6, where all Polymorphic Code Section(s) in a PE is/are converted to Unexecutable Code Section(s) for creating an EUC and where only some, but not all, Polymorphic Code Section(s) in a PE is/are converted to Unexecutable Code Section(s) for creating a PEUC:

(16) a) In steps 302 and 502, creating a corresponding PE with Polymorphic Code Section(s) encrypted therein as described in (8) above and shown in the example Polymorphic Code Section 216 of FIG. 2;

(16) b) In steps 304 and 504, extracting the encrypted Polymorphic Code Section(s) out of the corresponding PE. In steps 306 and 506, the encrypted Polymorphic Code Section(s) so extracted is/are to be saved or stored in the server or computer or machine or device administering such encrypted Polymorphic Code Section(s) for the purpose of delivering or transmitting such encrypted Polymorphic Code Section(s) for use later by the EUC or PEUC running in Device(s); or should be made available, for instance such as saved or stored in some accessible fixed or removable storage medium thus installed or presented to the EUC or PEUC running in Device(s).

(16) c) In steps 308 and 508, ascertaining and saving/storing the locational information, about where the encrypted Polymorphic Code Section(s) begin(s) or end(s) in the corresponding PE. This locational information is best to be saved or stored with the corresponding encrypted Polymorphic Code Section(s) in the server or computer or machine or device administering such encrypted Polymorphic Code Section(s) and the corresponding locational information for the purpose of delivering or transmitting such encrypted Polymorphic Code Section(s) and the corresponding locational information for use later by the EUC or PEUC running in Device(s); or should be made available, for instance such as saved or stored in some accessible fixed or removable storage medium thus installed or presented to the EUC running in Device(s). This step is optimal if it is certain that such locational information can be identified or reconstructed through matching the digital pattern of the encrypted Polymorphic Code Section(s) against the corresponding Unexecutable Code Section(s) by the EUC or PEUC while running. For instance, such identification or re-construction process can rely on some identifiable information that is left within the Unexecutable Code Section(s), such as encryption/decryption key(s), header signature, footer signature, checksum or error-checking signature, or other information left for such purpose; and such identifiable information can be matched with corresponding information within corresponding encrypted Polymorphic Code Section(s) for correct identification of where such encrypted Polymorphic Code Section(s) is/are to be placed for replacing the corresponding Unexecutable Code Section(s) within the EUC or PEUC;

(16) d) In steps 310 and 510, converting the encrypted Polymorphic Code Section(s) into unexecutable code, thus creating the Unexecutable Code Section(s) such as the exemplary Unexecutable Code Sections 418 and 618 of the Polymorphic Code Sections 416 and 616 shown in FIGS. 4 and 6, whether in a pattern of all zeros or all ones or in one of the patterns ranging from all zeros to all ones or in a scramble-at-random pattern, and, if and where necessary, superimposing the pattern with such matching information required as in (16) c) such as if the locational information relating to the encrypted Polymorphic Code Section(s) is not available for use while the EUC or the PEUC is running. In the embodiment shown in FIG. 4, section 417 of the Polymorphic Code Sections 416 is converted into the Unexecutable Code Section 418. In the exemplary embodiment shown in FIG. 6, section 617 of the Polymorphic Code Section 616 is converted into the Unexecutable Code Section 618.

The process of distribution, execution and use of the PE, EUC and PEUC is described as follows:

(17) So all these executables including Polymorphic Executables, Executables with Unexecutable Code and Polymorphic Executables with Unexecutable Code, as well as the Polymorphic Code Section(s) and the corresponding locational information, if any, extracted or created separately for replacing the corresponding Unexecutable Code Section(s) within the EUC and PEUC, can be distributed through transmission over local network or internet or through ordinary mails or by other means of transmission or other ways of delivery or distribution for use in Device(s). Other ordinary executables, if any required as in the case for distributing a Polymorphic Operating System, can be also distributed together as well.

(18) As described in (9) and (10) above, when a PE is run up, identifying information or identifier(s) for use as encryption/decryption key(s) is/are be retrieved by the RF in the General Code Section(s) from the encryption/decryption key holder, if any, within the Polymorphic Code Section and/or from the general-purpose computing or processing environment and/or supplied on run-time by the user using the PE and/or supplied over network, whether local network or internet, by a server or computer or machine or device administering such key(s) for use in encryption/decryption process of the Polymorphic Code Section(s) within the PE for successful execution in Device(s) in different authenticated or authorized states.

(19) When an EUC is run up, it is loaded into memory just like normal code;

(20) Upon execution, the EUC first locates the Unexecutable Code Section when it attempts to call a function therein;

(21) The EUC then obtains, over network, whether local network or internet, from a server or computer or machine or device for such administration, the corresponding Polymorphic Code Section and the corresponding locational information, if any, or it identifies the corresponding matching locational information found within the corresponding pair of Polymorphic Code Section and Unexecutable Code Section, for replacing the Unexecutable Code Section within the EUC;

(22) a) Either the EUC then decrypts the Polymorphic Code Section so obtained, using the corresponding encryption/decryption algorithm(s) and using, as the encryption/decryption key, the identifying information or identifier(s) embedded in the encryption/decryption key holder, if any, within the Polymorphic Code Section and/or the identifying information or identifier(s) supplied, if any, by the programme designer or maker of the Polymorphic Code Section(s), and/or the identifying information or identifier(s) collected from the Device(s) and/or other identifying information or identifier(s) as supplied by the user for the encryption/decryption purpose through all means of transmission or delivery, including transmission over local network or internet or through ordinary mails or by other means of transmission or other ways of delivery or distribution; and then replaces the corresponding Unexecutable Code Section with the Polymorphic Code Section just decrypted, using either the corresponding locational information or the corresponding matching locational information;

(22) b) Or the EUC replaces the corresponding Unexecutable Code Section with the Polymorphic Code Section just obtained, using either the corresponding locational information or the corresponding matching locational information; and then decrypts the undecrypted Polymorphic Code Section now found within the EUC, using the corresponding encryption/decryption algorithm(s) and using, as the encryption/decryption key, the identifying information or identifier(s) embedded in the encryption/decryption key holder, if any, within the Polymorphic Code Section and/or the identifying information or identifier(s) supplied, if any, by the programme designer or maker of the Polymorphic Code Section(s), and/or the identifying information or identifier(s) collected from the Device(s) and/or other identifying information or identifier(s) as supplied by the user for the encryption/decryption purpose through all means of transmission or delivery, including transmission over local network or internet or through ordinary mails or by other means of transmission or other ways of delivery or distribution;

(23) The EUC now calls the function in the Polymorphic Code Section just replaced into the EUC;

(24) If so designed, the function so called by the EUC in (23) calls the corresponding encryption algorithm to re-encrypt the Polymorphic Code Section before it returns. Or the function simply returns without calling the corresponding encryption algorithm for re-encryption. And the EUC continues with the programme logics immediately following the return of the function so called.

(25) When a PEUC is run up, it is loaded into memory just like normal code;

(26) Upon execution, the PEUC first locates the Unexecutable Code Section or Polymorphic Code Section when it attempts to call a function therein;

(27) If the function is found to be in a Polymorphic Code Section, then the PEUC does just what a PE does as described in (10) above;

(28) If the function is found to be in an Unexecutable Code Section, the PEUC then obtains, over network, whether local network or internet, from a server or computer or machine or device for such administration, the corresponding Polymorphic Code Section and the corresponding locational information, if any, or it identifies the corresponding matching locational information found within the corresponding pair of Polymorphic Code Section and Unexecutable Code Section, for replacing the Unexecutable Code Section within the PEUC;

(29) a) Either the PEUC then decrypts the Polymorphic Code Section so obtained, using the corresponding encryption/decryption algorithm(s) and using, as the encryption/decryption key, the identifying information or identifier(s) embedded in the encryption/decryption key holder, if any, within the Polymorphic Code Section and/or the identifying information or identifier(s) supplied, if any, by the programme designer or maker of the Polymorphic Code Section(s), and/or the identifying information or identifier(s) collected from the Device(s) and/or other identifying information or identifier(s) as supplied by the user for the encryption/decryption purpose through all means of transmission or delivery, including transmission over local network or internet or through ordinary mails or by other means of transmission or other ways of delivery or distribution; and then replaces the corresponding Unexecutable Code Section with the Polymorphic Code Section just decrypted, using either the corresponding locational information or the corresponding matching locational information;

(29) b) Or the PEUC replaces the corresponding Unexecutable Code Section with the Polymorphic Code Section just obtained, using either the corresponding locational information or the corresponding matching locational information; and then decrypts the undecrypted Polymorphic Code Section now found within the PEUC, using the corresponding encryption/decryption algorithm(s) and using, as the encryption/decryption key, the identifying information or identifier(s) embedded in the encryption/decryption key holder, if any, within the Polymorphic Code Section and/or the identifying information or identifier(s) supplied, if any, by the programme designer or maker of the Polymorphic Code Section(s), and/or the identifying information or identifier(s) collected from the Device(s) and/or other identifying information or identifier(s) as supplied by the user for the encryption/decryption purpose through all means of transmission or delivery, including transmission over local network or internet or through ordinary mails or by other means of transmission or other ways of delivery or distribution;

(30) The PEUC now calls the function in the Polymorphic Code Section just replaced into the PEUC;

(31) If so designed, the function so called by the PEUC in (30) calls the corresponding encryption algorithm to re-encrypt the Polymorphic Code Section before it returns. Or the function simply returns without calling the corresponding encryption algorithm for re-encryption. And the PEUC continues with the programme logics immediately following the return of the function so called.

In addition to the above description for executing the EUC and PEUC, the EUC or PEUC should have a function of making use of such locational information for successfully replacing the corresponding Unexecutable Code Section(s) with the corresponding Polymorphic Code Section(s) respectively. If such locational information is not saved or not stored or not available to the EUC or PEUC that is running, the EUC or PEUC should have another mechanizm or function(s) of identifying where to place the Polymorphic Code Section(s) so obtained for replacing the corresponding Unexecutable Code Section(s). Such identification process can rely on some identifiable information that is left within the Unexecutable Code Section(s), such as encryption/decryption key(s), header signature, footer signature, checksum or error-checking signature, or other information left for such purpose; and such identifiable information can be matched with corresponding information within corresponding Polymorphic Code Section(s) so obtained for correct identification of where such Polymorphic Code Section(s) is/are to be placed for replacing the corresponding Unexecutable Code Section(s) within the EUC or PEUC.

Of course, with such matching information left behind, the EUC or PEUC can be considered not as highly secure or protected as the PE for protecting the intellectual property embedded therein.

(32) If the EUC or PEUC is not in a network environment or only in standalone unconnected Device(s), the Polymorphic Code Section(s) and their locational information, if any, intended for use for replacing the corresponding Unexecutable Code Section(s) within the EUC or PEUC should be made available, for instance such as saved or stored in some accessible fixed or removable storage medium thus installed or presented to the EUC or PEUC running in Device(s). The running of the EUC or PEUC then continues as in the same way as it is as described above for the Device(s) connected in a network environment as described above.

The process of creating Polymorphic Operating System (POS), an operating system made up of ordinary Executables, PE, EUC and PEUC in different combinations or different degrees of mixture with as least one PE or one EUC or one PEUC as well as the Polymorphic Code Section(s) and the corresponding locational information, if any, so extracted or obtained from the corresponding PE, EUC and PEUC as described above, includes at least one of the following steps:

(33) a) creating executable(s) as PE as described above;
(33) b) creating executable(s) as EUC as described above; and
(33) c) creating executable(s) as PEUC as described above;

The process of executing POS includes at least one of the following steps:

(34) a) executing PE as described above;
(34) b) executing EUC as described above; and
(34) c) executing PEUC as described above.

The process of distributing and using POS is as follows:

(35) So all executables, making up a POS, including, ordinary Executable(s), PE, EUC, PEUC, as well as the Polymorphic Code Section(s) and the corresponding locational information, if any, extracted or obtained from the corresponding PE, EUC and PEUC as described above, can be distributed through transmission over local network or internet or through ordinary mails or by other means of transmission or other ways of delivery or distribution for use in Device(s), facilitating the installation, activation, authentication and starting-up process, for instance, using the small number of installation files, start-up files or crucial kernel files that are put into the PE, EUC and PEUC formats, as well as protecting the intellectual property embedded in the PE, EUC, PEUC and the Polymorphic Operating System as a whole.

Advantageous Effects

Using PE as an example for exposition, this invention differs from the method used by other encryption/decryption shells or wrappers commonly used in protecting executables in the following ways:

(I) Using this invention, there is no visible signature inside the encrypted executable. In other encryption/decryption shells or wrappers, there is usually some information inside the executable to indicate which encryption/decryption shell or wrapper is used so that a standard method can be devised for removing the encryption/decryption shell or wrapper under concern for all the executables processed by the respective shelling or wrapping.

(II) Using this invention, the selection of section(s) to be used as Polymorphic Code Section(s) for applying encryption/decryption is at source level, and the choice is totally up to the programme designer or maker who can decide which section(s) of code is/are to be encrypted/decrypted. In other encryption/decryption shells or wrappers, the executable intended to be protected is encrypted/decrypted as a whole. It is therefore relatively easier to strip away the encryption/decryption shells or wrappers to obtain the original executable as a whole. However with the use of this invention, as the executable is not to be encrypted/decrypted as a whole and the General Code Section(s) and Polymorphic Code Section(s) in a PE can be designed to be laid out in a zebra-crossing or striped pattern. And each Polymorphic Code Section is not executable by itself. So hacking of a PE and reassembling the individual General Code Section(s) and Polymorphic Code Section(s) together through reverse-engineering is far more difficult than for those executables using the encryption/decryption shells or wrappers. This is so especially given the further enhancements described above in relation to multiple passes of encryption/decryption by using different encryption/decryption algorithms hidden within nested Polymorphic Code Section(s). Therefore, there is no standard way of doing hacking, reverse-engineering, re-constructing and reassembling for PE designed with the use of this invention.

This invention makes possible the running of Polymorphic Executable and its variants, EUC and PEUC, as well as Polymorphic Operating System(s) as mentioned above in Device(s) for use in a general-purpose computing or processing environment without the need for deploying specially designed apparatuses.

For instance, every PE is different from every other PE running in different authenticated or authorized states. Piracy of intellectual property through simple copying or hacking of executable images stored on storage medium is almost possible. Reverse-engineering and reassembling of the running image of PE in system memory faces great difficulty of identifying where Polymorphic Code Section(s) begin(s) and end(s), breaking nested images of Polymorphic Code Section(s) hidden by multiple passes of different encryption/decryption algorithms and tracing programme logics flows passing through nested Polymorphic Code Sections.

As there is no standard pattern in which General Code Sections and Polymorphic Code Sections are divided, placed, juxtaposed and nested and no standard way in which multiple passes of encryption/decryption of Polymorphic Code Sections are applied with different encryption/decryption algorithms, the dynamic changing image of the PE in system memory may present tremendous hurdles, if not insurmountable, that hackers have to overcome to reverse-engineer, re-construct and re-assemble an executable running image with all the functionalities of the original programme that can nicely fit together to run successfully. The difficulties multiply if the programme under hacking consists of, not just one, but dozens of PE running simultaneously. If the time spent on hacking, reverse-engineering, re-constructing and re-assembling of the PE is more than the time for the hacker to re-write the programme from scratch, the hacker will give up.

This invention therefore reveals a method providing a flexible and more effective schema for protecting intellectual activities as embodied in executable code. Depending on the level of security and protection for which the intellectual property as embodied in the executable code is required, the programme designer or maker can implement different combinations of the features outlined in this invention, from a PE with only one General Code Section and one Polymorphic Code Section to a PE with multiple General Code Sections and multiple nested Polymorphic Code Sections with multiple passes of encryption/decryption using different hidden encryption/decryption algorithms of choice.

The degree of security and protection is further enhanced if the PE or EUC or PEUC is to be run in a network environment in which the Polymorphic Code Sections can be passed from a server or servers to its client machine, or from one machine to another machine and such Polymorphic Code Sections may have to be encrypted/decrypted using uncertain encryption/decryption algorithms and unknown encryption/decryption key(s) which are supplied only when the PE or EUC or PEUC is run. Polymorphic Code Sections not being used in run-time at any moment can be turned into scrambled-at-random Unexecutable Code Sections.

So network distribution of Polymorphic Code Section(s), encryption/decryption key(s) and the PE or EUC or PEUC itself can be achieved. Based on this, the distribution, deployment and activation of Polymorphic Operating Systems is made possible. And as a Polymorphic Operating System does not need to have all its ex-ecutables in PE or EUC or PEUC format, only some small number of installation files, start-up files or crucial kernel files need to be in these formats to make any operating system securely deployed and activated. So these small number of installation files, start-up files or crucial kernel files can be provided as PE or EUC or PEUC or a combination of these. These small number of installation files, start-up files or crucial kernel files can therefore be easily provided through internet for activating and running the Polymorphic Operating System. Such small number of installation files, start-up files or crucial kernel files can also be saved or stored permanently on the Device in which the Polymorphic Operating System is intended to run. Such an operating system, or the small number of installation files, start-up files or crucial kernel files so saved or stored as just mentioned, when moved to another Device with the same architecture cannot be run up successfully. And if all the files in the Polymorphic Operating System are designed to be in PE or EUC or PEUC format, then the possibility of having the operating system copied to be used from one Device to another Device is almost nonexistent. Incidentally, it is found that the upcoming Microsoft Windows Vista operating system is still not yet a Polymorphic Operating System even though it is claimed to be encrypted with advanced encryption algorithm for running, And if installed on a hard disk, Microsoft Windows Vista can be moved to run from one machine to another machine with the same architecture. And without having to move the hard disk installed, a duplicated hard disk does also work.

Best Mode

The best and the simplest representation of this invention is the creation, distribution and execution in Device(s) of Polymorphic Executable. This provides the most secure or protected method for protecting the intellectual property embedded within the executable and avoids the complexity for retrieving Polymorphic Code Section(s) for replacing the Unexecutable Code Section(s) within EUC or PEUC for execution in Device(s), whether connected to network environment or not.

Mode For Invention

A variation of implementing this method of protection for intellectual property in the form of software programmes is to, instead of creating, distributing and executing PE, create, distribute and execute EUC or PEUC in Device(s), whether connected to network environment or not.

A further variation of implementing this method of protection for intellectual property in the form of software programmes is to create, distribute and executable Polymorphic Operation System(s) as mentioned above in Device(s), whether connected to network environment or not.

INDUSTRIAL APPLICABILITY

This invention therefore helps to protect intellectual property as embodied in executable code. Polymorphic Executable, Executable with Unexecutable Code or the hybrid of these two, Polymorphic Executable with Unexecutable Code, as well as Polymorphic Operating System can be designed, created and distributed, whether through network or not, for use in Device(s) in a general-purpose computing or processing environment under authenticated or authorized state.

Operating systems can be designed with such principles as revealed in this invention in mind that new executable formats can be conceived and standardized. Programming and compilation tools for making executables, such as programming languages, programming macros, compilers and pre-compilers or pre-processors, etc. can be designed and created to facilitate the making of PE, EUC and PEUC as well as Polymorphic Operating System.

The prior art for the implementation of this invention includes encryption/decryption algorithms and the knowledge of using such algorithms; programming languages and compilers for making executable code and operating systems and the related knowledge; the hardware of any device(s), whether networked or standalone, including computer system(s) or computer-controlled device(s) or operating-system-controlled device(s) or system(s), capable of running executable code; and computer-executable or operating-system-executable instructions or programmes that help perform the steps for the method of this invention. In combination with the use of the technical features contained in the prior art stated above, this invention makes possible the creation, distribution and execution in Device(s) of executable code, such as boot code, programmes, applications, device drivers, or a collection of such executables constituting an operating system in the form of executable code embedded or stored into hardware, such as embedded or stored in all types of storage medium, including read-only or rewriteable or volatile or non-volatile storage medium in the form of virtual disk in physical memory or internal DRAM (Dynamic Random Access Memory) or hard disk or solid state flash disk or ROM (Read Only Memory), or read only or rewriteable CD/DVD/HD-DVD/Blu-Ray DVD or hardware chip or chipset etc.; the executable code being in the form of Polymorphic Executable (PE), Executable with Unexecutable Code (EUC), Polymorphic Executable with Un-executable Code (PEUC) and Polymorphic Operation System (POS) runnable in an authenticated or authorized state for the protection of intellectual property; and in this relation, is characterized by the following claims:

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for creating executable code for one or more of boot code, programs, applications, device drivers, or a collection of executables constituting an operating system, to be embedded into hardware of a computing device, or stored in a storage medium, the executable code being in the form of a Polymorphic Executable (PE) runnable in an authenticated or authorized state for protection of intellectual property, the method comprising at least one of the following steps for creating the PE:
    selecting a programming language for writing the PE;
    determining one or more features or functions to be included in a General Code Section or in a Polymorphic Code Section;

writing the General Code Section as normal code which does not require decryption would be written; and incorporating changes into the General Code Section resulting from the need for writing the Polymorphic Code Section;

writing the Polymorphic Code Section as follows:
  making a memory reference to a global variable with a wrapper in the Polymorphic Code Section;
  replacing a static local variable with the global variable, and memory reference;
  using a static string with the wrapper in the Polymorphic Code Section; and
  using pointers to a function or the global variable with the wrapper in the Polymorphic Code Section;

adding a Polymorphic Code Section Header function with a Polymorphic Code Section header at the beginning of the Polymorphic Code Section, wherein the header contains at least a header signature holder for holding a header signature;

adding a Polymorphic Code Section Footer function with a Polymorphic Code Section footer at the end of the Polymorphic Code Section, wherein the footer contains at least a footer signature holder for holding a footer signature;

compiling, by a computer, the designed and written General and Polymorphic Code Sections to generate the executable code;

encrypting, by the computer, the executable code or a copy of the executable code by:
  scanning the executable code for the Polymorphic Code Section Header and Polymorphic Code Section Footer signatures of the Polymorphic Code Section to determine where the encryption of the Polymorphic Code Section begins and ends;
  encrypting the Polymorphic Code Section, using a selected encryption algorithm and using, as an encryption key:
    identifying information supplied by a maker of the Polymorphic Code Section;
    identifying information collected from the computing device; or
    other identifying information supplied by a user for the encryption through a means of transmission or delivery, including one more or more of:
      transmission over a local network;
      transmission via the Internet; and delivery by email or by other electronic message means.

2. The method of claim 1, further comprising distributing the PE for use in the computing device by performing at least one of the following steps:
  transmitting the PE over a local network;
  transmitting the PE via the Internet; and
  distributing the PE through email or other electronic message.

3. A method for running executable code on a computing device, executable code comprising boot code, programs, applications, device drivers, or a collection of executables constituting an operating system, wherein the executable code is to be embedded into hardware of the computing device, or stored in a storage medium, the executable code being in the form of a Polymorphic Executable (PE) runnable in an authenticated or authorized state for protection of intellectual property, the method comprising performing at least one of the following steps for executing the PE:
  loading the PE and a Polymorphic Code Section within the PE into memory as normal code would be;
  locating, by the PE, the Polymorphic Code Section when the PE attempts to call a function that is inside the Polymorphic Code Section;
  checking, by the PE, whether the Polymorphic Code Section has been decrypted or not;
  in response to determining that that the Polymorphic Code Section has not been decrypted, decrypting, by the PE, the Polymorphic Code Section using a decryption algorithm; and using, as a decryption key:
    identifying information embedded in the encryption key holder within the Polymorphic Code Section;
    identifying information supplied by a maker of the Polymorphic Code Section;
    identifying information collected from the computing device; or
    other identifying information as supplied by a user for the decryption through a means of transmission or delivery, including one more or more of:
      transmission over a local network;
      transmission via the Internet; or
      delivery through electronic message means;
  calling, by the PE, the function in the decrypted Polymorphic Code Section; and
  calling, by the function called by the PE, the encryption algorithm to re-encrypt the Polymorphic Code Section before the function returns;
  returning, by the function, without calling the encryption algorithm for re-encryption so that the PE continues executing following the return of the function.

4. A method for creating executable code for one or more of boot code, programs, applications, device drivers, or a collection of executables constituting an operating system, the executable code to be embedded into hardware of a computing device or a storage medium in the form of an Executable with Unexecutable Code (EUC) runnable in an authenticated or authorized state for protection of intellectual property, the method comprising at least one of the following steps for converting all Polymorphic Code Sections in a Polymorphic Executable (PE) to Unexecutable Code Sections:
  creating a PE by:
    selecting a programming language of choice for writing the PE;
    deciding and designing a feature to be included in a General Code Section or in a Polymorphic Code Section;
    writing the General Code Section as normal code which does not require encryption would be written;
    incorporating changes resulting from the need for writing the Polymorphic Code Section;
    writing the Polymorphic Code Section by:
      making a memory reference to a global variable with a wrapper in the Polymorphic Code Section;
      replacing a static local variable with the global variable so that a memory reference is made to the global variable;
      using a static string with the wrapper in the Polymorphic Code Section;
      using pointers to a function or the global variable with the wrapper in the Polymorphic Code Section;
    adding a Polymorphic Code Section Header function with a Polymorphic Code Section header at the beginning of the Polymorphic Code Section, wherein the header contains at least a header signature holder for holding a header signature;
    adding a Polymorphic Code Section Footer function with a Polymorphic Code Section footer at the end of the Polymorphic Code Section, wherein the footer contains at least a footer signature holder for holding a footer signature;

compiling, by a computer, the designed and written General and Polymorphic Code Sections to generate the executable; and encrypting, by the computer, the executable or a copy of the executable by:
- scanning the executable for the Polymorphic Code Section Header and Polymorphic Code Section Footer signatures of the Polymorphic Code Section to determine where the encryption of the Polymorphic Code Section should begin and end; and
- encrypting the Polymorphic Code Section, using an encryption algorithm and using, as an encryption key:
  - identifying information supplied by a maker of the Polymorphic Code Section;
  - identifying information collected from the computing device; or
  - other identifying information supplied by a user for the encryption through a means of transmission or delivery, including one more or more of:
    - transmission over a local network;
    - transmission via the Internet; and
    - delivery through email or by other electronic message means;

extracting the encrypted Polymorphic Code Section from the PE created by the creating;

storing the extracted, encrypted Polymorphic Code Section on a storage medium accessible by the computing device or a server configured to administer and deliver the encrypted Polymorphic Code Section for use by the EUC in the running computing device;

ascertaining the locational information indicating where the encrypted Polymorphic Code Section begins or ends in the corresponding PE;

storing the locational information on the storage medium for use by the computing device or in the server administering the locational information or on an accessible fixed or removable storage medium;

leaving some identifiable information within the Un-executable Code Section, the identifiable information comprising one or more of: encryption keys, a header signature, a footer signature, a checksum or error-checking signature, or other identifiable information for matching with corresponding information within the corresponding encrypted Polymorphic Code Section for identifying where the encrypted Polymorphic Code Section is to be placed for replacing the corresponding Unexecutable Code Section within the EUC; and converting the encrypted Polymorphic Code Section into unexecutable code, thus creating the Unexecutable Code Section, as a pattern of: all zeros; all ones; in one of a plurality of patterns ranging from all zeros to all ones; or in a scramble-at-random pattern; and superimposing the pattern with matching information required for the ascertaining in response to determining that the locational information relating to the encrypted Polymorphic Code Section is not available for use while the EUC is running.

5. The method of claim 4, wherein EUC is runnable in an authenticated or authorized state for protection of intellectual property, the method further comprising distributing the EUC, the corresponding Polymorphic Code Section, and the corresponding locational information for use in the computing device by performing one or more of the following steps:

transmitting one or more of the EUC, the Polymorphic Code Section, and the locational information over a local network;

transmitting one or more of the EUC, the Polymorphic Code Section, and the locational information via the Internet; and delivering one or more of the EUC, the Polymorphic Code Section, and the locational information through email or other electronic message means.

6. A method for running executable code for one or more of boot code, programs, applications, device drivers, or a collection of executables constituting an operating system, the executable code to be embedded into hardware of a computing device or stored in a storage medium, the executable code being in the form of an Executable with Unexecutable Code (EUC) runnable in an authenticated or authorized state for protection of intellectual property the method comprising performing at least one of the following steps:

in response to detecting that the EUC is run up, loading it into memory as normal code would be;

locating, by the EUC, an Unexecutable Code Section when the EUC attempts to call a function therein;

the EUC obtaining either:
- a corresponding Polymorphic Code Section and corresponding locational information over a local network or the Internet, from a storage medium accessible by the computing device running the EUC or a server configured to administer the Polymorphic Code Section and the locational information; or
- the corresponding Polymorphic Code Section over a local network or the Internet, from a storage medium accessible by the computing device running the EUC or a server configured to administer the Polymorphic Code Section, and identifying corresponding matching locational information, if any, found within a corresponding pair of the Polymorphic Code Section and the Unexecutable Code Section, for the corresponding locational information;

replacing the Unexecutable Code Section within the EUC;

the EUC then either:
- decrypting the obtained Polymorphic Code Section using a corresponding decryption algorithm and using, as the decryption key:
  - identifying information embedded in the encryption key holder within the obtained Polymorphic Code Section;
  - identifying information supplied by a maker of the Polymorphic Code Section;
  - identifying information collected from the computing device; or
  - other identifying information as supplied by a user for decryption through a means of transmission or delivery including one or more of: transmission over a local network; transmission via the Internet; and delivery through email or by other electronic message means; and
- replacing the corresponding Unexecutable Code Section with the decrypted Polymorphic Code Section, using either the corresponding locational information or the corresponding matching locational information; or
- replacing the corresponding Unexecutable Code Section with the obtained Polymorphic Code Section, using either the corresponding locational information or the corresponding matching locational information; and then decrypting the encrypted Polymorphic Code Section found within the EUC, using the corresponding decryption algorithm and using, as the decryption key:
  identifying an identifier embedded in the encryption key holder within the Polymorphic Code Section;
  identifying information supplied by a maker of the Polymorphic Code Section;
  identifying information collected from the computing device; or
  other identifying information as supplied by a user for decryption through a means of transmission or delivery including one or more of: transmission over a local network; transmission via the Internet; and delivery through email or by other electronic message means;
calling, by the EUC, the function in the Polymorphic Code Section replaced into the EUC;
calling, by the function called by the EUC, the corresponding encryption algorithm to re-encrypt the Polymorphic Code Section before it returns;
returning, by the function, without calling the corresponding encryption algorithm for re-encryption so that the EUC continues executing following the return of the function.

7. A method for creating executable code for one or more of boot code, programs, applications, device drivers, or a collection of executables constituting an operating system, the executable code to be embedded into hardware of a computing device or a storage medium in the form of a Polymorphic Executable with Unexecutable Code (PEUC) runnable in an authenticated or authorized state for protection of intellectual property, the method comprising at least one of the following steps for converting some, but not all, Polymorphic Code Sections in a Polymorphic Executable (PE) to Unexecutable Sections:
  creating the PE by performing at least one of the following steps:
    selecting a programming language of choice for writing the PE;
    deciding and designing features or functions to be included in General Code Sections or in the Polymorphic Code Sections;
    writing the General Code Sections as normal code which does not require encryption would be written;
    incorporating changes resulting from the need for providing for writing Polymorphic Code Section; and
    writing the Polymorphic Code Section by:
      making a memory reference to a global variable with a wrapper in the Polymorphic Code Section;
      replacing a static local variable with the global variable so that a memory reference is made to the global variable;
      using a static string with the wrapper in the Polymorphic Code Section; and
      using pointers to a function or the global variable with the wrapper in the Polymorphic Code Section;
    adding a Polymorphic Code Section Header function with a Polymorphic Code Section header at the beginning of Polymorphic Code Sections, wherein the header contains at least a header signature holder for holding a header signature;
    adding a Polymorphic Code Section Footer function with a Polymorphic Code Section footer at the end of the Polymorphic Code Section, wherein the footer contains at least a footer signature holder for holding a footer signature;
  compiling, by a computer, the designed and written General and Polymorphic Code Sections to generate the executable code;
  encrypting, by the computer, the executable or a copy of the executable code by:
    scanning the executable code for the Polymorphic Code Section Header and Polymorphic Code Section Footer signatures of the Polymorphic Code Section to determine where the encryption of the Polymorphic Code Section begins and ends;
    encrypting the Polymorphic Code Section, using a selected encryption algorithm and using, as an encryption key:
      identifying information supplied by a maker of the Polymorphic Code Section,
      identifying information collected from the computing device,
      or other identifying information supplied by a user for the encryption through a means of transmission or delivery, including one more or more of:
      transmission over a local network;
      transmission via the Internet; and
      delivery by email or by other electronic message means;
  extracting the encrypted Polymorphic Code Section from the PE created by the creating;
  storing the extracted, encrypted Polymorphic Code Section on a storage medium accessible by the computing device or a server configured to administer and deliver the encrypted Polymorphic Code Section for use by the PEUC in the running computing device;
  ascertaining the locational information indicating where the encrypted Polymorphic Code Section begins or ends in the corresponding PE;
  storing the locational information on the storage medium for use by the computing device or in the server administering the locational information or on accessible fixed or removable storage medium;
  leaving some identifiable information within the Un-executable Code Section, the identifiable information comprising one or more of: encryption keys, a header signature, a footer signature, a checksum or error-checking signature, or other identifiable information for matching with corresponding information within the corresponding encrypted Polymorphic Code Section for identifying where the encrypted Polymorphic Code Section is to be placed for replacing the corresponding Unexecutable Code Section within the PEUC; and
  converting the encrypted Polymorphic Code Section into unexecutable code, thus creating the Unexecutable Code Section, as a pattern of: all zeros; all ones; in one of a plurality of patterns ranging from all zeros to all ones; or in a scramble-at-random pattern; and
  superimposing the pattern with matching information required for the ascertaining in response to determining that the locational information relating to the encrypted Polymorphic Code Section is not available for use while the PEUC is running.

8. The method of claim 7, further distributing the PEUC, the corresponding Polymorphic Code Sections, and the corresponding locational information, if any, for use in the computing device, the distributing comprising at least one of the following steps:
  transmitting one or more of the PEUC, the Polymorphic Code Sections, and the locational information over a local network;

transmitting one or more of the PEUC, the Polymorphic Code Sections, and the locational information via the Internet; and delivering one or more of the PEUC, the Polymorphic Code Sections, and the locational information through electronic message means.

9. A method for running executable code for one or more of boot code, programs, applications, device drivers, or a collection of executables constituting an operating system, the executable code to be embedded into hardware of a computing device or stored in a storage medium, the executable code being in the form of a Polymorphic Executable with Unexecutable Code (PEUC) runnable in an authenticated or authorized state for protection of intellectual property the method comprising performing at least one of the following steps:

in response to detecting that the PEUC is run up, loading it into memory as normal code would be;

locating, by the PEUC, an Unexecutable Code Section when the PEUC attempts to call a function therein;

if the function is found to be in a Polymorphic Code Section, then the PEUC performs at least one of the following steps for executing:

checking, by the PEUC, whether the Polymorphic Code Section has been decrypted or not;

in response to determining that that the Polymorphic Code Section has not been decrypted, decrypting, by the PEUC, the Polymorphic Code Section using a decryption algorithm; and using, as a decryption key:

identifying an identifier embedded in the encryption key holder within the Polymorphic Code Section;

identifying information supplied by a maker of the Polymorphic Code Section;

identifying information collected from the computing device; or other identifying information as supplied by a user for the decryption through a means of transmission or delivery, including one more or more of:

transmission over a local network;

transmission via the Internet; or delivery through email or by other electronic message means;

calling, by the PEUC, the function in the decrypted Polymorphic Code Section; and calling, by the function called by the PEUC, the encryption algorithm to re-encrypt the Polymorphic Code Section before the function returns;

returning, by the function, without calling the encryption algorithm for re-encryption so that the PEUC continues executing following the return of the function if the function is found to be in an Unexecutable Code Section, the PEUC then does at least one of the following steps:

the PEUC obtaining either:

a corresponding Polymorphic Code Section and corresponding locational information over a local network or the Internet, from a storage medium accessible by the computing device running the PEUC or a server configured to administer the Polymorphic Code Section and the locational information; or the corresponding Polymorphic Code Section over a local network or the Internet, from a storage medium accessible by the computing device running the PEUC or a server configured to administer the Polymorphic Code Section, and identifying corresponding matching locational information found within a corresponding pair of the Polymorphic Code Section and the Unexecutable Code Section, for the corresponding locational information;

replacing the Unexecutable Code Section within the PEUC;

the PEUC then either:

decrypting the obtained Polymorphic Code Section using a corresponding decryption algorithm and using, as the decryption key:

identifying an identifier embedded in the encryption key holder within the obtained Polymorphic Code Section;

identifying information supplied by a maker of the Polymorphic Code Section;

identifying information collected from the computing device; or other identifying information as supplied by a user for decryption through a means of transmission or delivery including one or more of: transmission over a local network; transmission via the Internet; and delivery through email or by other electronic message means; and replacing the corresponding Unexecutable Code Section with the decrypted Polymorphic Code Section, using either the corresponding locational information or the corresponding matching locational information; or replacing the corresponding Unexecutable Code Section with the obtained Polymorphic Code Section, using either the corresponding locational information or the corresponding matching locational information; and then decrypting the encrypted Polymorphic Code Section found within the PEUC, using the corresponding decryption algorithm and using, as the decryption key:

identifying an identifier embedded in the encryption key holder within the Polymorphic Code Section;

identifying information supplied by a maker of the Polymorphic Code Section;

identifying information collected from the computing device; or other identifying information as supplied by a user for decryption through a means of transmission or delivery including one or more of: transmission over a local network; transmission via the Internet; and delivery through email or by other electronic message means;

calling, by the PEUC, the function in the Polymorphic Code Section replaced into the PEUC;

calling, by the function called by the PEUC, the corresponding encryption algorithm to re-encrypt the Polymorphic Code Section before it returns;

returning, by the function, without calling the corresponding encryption algorithm for re-encryption so that the PEUC continues executing following the return of the function.

10. A method for creating executable code making up a collection of executables constituting an operating system to be embedded into hardware of a computing device or stored in a storage medium, the executable code being in the form of a Polymorphic Operation System (POS), an operating system made up of ordinary Executables, a Polymorphic Executable (PE), an Executable with Unexecutable Code (EUC), and a Polymorphic Executable with Unexecutable Code (PEUC) in different combinations or different degrees of mixture with at least one PE or one EUC or one PEUC as well as a Polymorphic Code Section and corresponding locational information extracted or obtained from the corresponding PE, EUC, and PEUC, the POS being runnable in an authenticated or authorized state for protection of intellectual property, the method comprising one of the following steps:
  creating executables for the POS as a PE as in claim 1;
  creating executables for the POS as an EUC as in claim 4; and
  creating executables for the POS as a PEUC as in claim 7.

11. The method of claim 10, further comprising distributing the POS by performing at least one of the following steps:
  transmitting the POS over a local network;
  transmitting the POS via the Internet; and
  distributing the POS through email or other electronic message.

12. A method making up a collection of executables constituting an operating system to be embedded into hardware of a computing device or stored in a storage medium, the executable code being in the form of a Polymorphic Operation System (POS), an operating system made up of ordinary Executables, a Polymorphic Executable (PE), an Executable with Unexecutable Code (EUC), and a Polymorphic Executable with Unexecutable Code (PEUC) in different combinations or different degrees of mixture with at least one PE or one EUC or one PEUC as well as a Polymorphic Code Section and corresponding locational information extracted or obtained from the corresponding PE, EUC, and PEUC, the POS being runnable in an authenticated or authorized state for protection of intellectual property, the method comprising one of the following steps:
  executing the POS as a PE as in claim 3;
  executing the POS as an EUC as in claim 6; and
  executing the POS as a PEUC as in claim 9.

13. The method of claim 1, further comprising:
  embedding the created Polymorphic Executable (PE) into hardware of the computing device; or
  storing the PE as a computer program product in a storage medium, wherein the storage medium is one or more of:
  a read-only storage medium;
  a rewriteable storage medium;
  a volatile or non-volatile storage medium;
  a virtual disk in physical memory;
  internal Dynamic Random Access Memory;
  a hard disk;
  a solid state flash disk;
  Read Only Memory;
  a read only or rewriteable CD or DVD or HD-DVD or Blu-Ray DVD; and
  a hardware chip or chipset.

14. The method of claim 1, further comprising installing the Polymorphic Executable (PE) in the computing device, wherein the computing device is one or more of:
  a computer system;
  a computer-controlled device;
  an operating-system-controlled device; and
  a system
  and wherein the computing device is capable of running the executable code of the created PE.

15. The method of claim 14, further comprising running the Polymorphic Executable (PE) in the computing device, wherein the computing device is one or more of:
  a computer system;
  a computer-controlled device;
  an operating-system-controlled device; and
  a system
  and wherein the computing device is capable of running the executable code of the created PE.

16. The method of claim 4, further comprising:
  embedding the created Executable with Unexecutable Code (EUC), into hardware of the computing device; or
  storing the EUC as a computer program product in a storage medium, wherein the storage medium is one or more of:
  a read-only storage medium;
  a rewriteable storage medium;
  a volatile or non-volatile storage medium;
  a virtual disk in physical memory;
  internal Dynamic Random Access Memory;
  a hard disk;
  a solid state flash disk;
  Read Only Memory;
  a read only or rewriteable CD or DVD or HD-DVD or Blu-Ray DVD; and
  a hardware chip or chipset.

17. The method of claim 4, further comprising installing the Executable with Un-executable Code (EUC) in the computing device, wherein the computing device is one or more of:
  a computer system;
  a computer-controlled device;
  an operating-system-controlled device; and
  a system
  and wherein the computing device is capable of running the executable code of the created EUC.

18. The method of claim 17, further comprising running the Executable with Un-executable Code (EUC) in the computing device, wherein the computing device is one or more of:
  a computer system;
  a computer-controlled device;
  an operating-system-controlled device; and
  a system
  and wherein the computing device is capable of running the executable code of the created EUC.

19. The method of claim 7, further comprising:
  embedding the created Polymorphic Executable with Unexecutable Code (PEUC) into hardware of the computing device; or
  storing the EUC as a computer program product in a storage medium, wherein the storage medium is one or more of:
  a read-only storage medium;
  a rewriteable storage medium;
  a volatile or non-volatile storage medium;
  a virtual disk in physical memory;
  internal Dynamic Random Access Memory;
  a hard disk;
  a solid state flash disk;
  Read Only Memory;
  a read only or rewriteable CD or DVD or HD-DVD or Blu-Ray DVD; and
  a hardware chip or chipset.

20. The method of claim 7, further comprising installing the Polymorphic Executable with Unexecutable Code (PEUC) in the computing device, wherein the computing device is one or more of:
  a computer system;
  a computer-controlled device;
  an operating-system-controlled device; and
  a system
  and wherein the computing device is capable of running the executable code of the created PEUC.

21. The method of claim 20, further comprising running the Polymorphic Executable with Unexecutable Code (PEUC) in the computing device, wherein the computing device is one or more of:
  a computer system;
  a computer-controlled device;

an operating-system-controlled device; and
a system
and wherein the computing device is capable of running the executable code of the created PEUC.

22. A method for creating a Polymorphic Operating System (POS) to be embedded into hardware of a computing device or stored in a storage medium,
   wherein the storage medium is one or more of:
   a read-only storage medium;
   a rewriteable storage medium;
   a volatile or non-volatile storage medium;
   a virtual disk in physical memory;
   internal Dynamic Random Access Memory;
   a hard disk;
   a solid state flash disk;
   Read Only Memory;
   a read only or rewriteable CD or DVD or HD-DVD or Blu-Ray DVD; and
   a hardware chip or chipset,
   the method comprising one of the following steps:
   creating executables for the POS as a PE as in claim 1;
   creating executables for the POS as an EUC as in claim 4; and
   creating executables for the POS as a PEUC as in claim 7.

23. A method for installing a Polymorphic Operating System (POS) in a computing device, wherein the computing device is one or more of:
   a computer system;
   a computer-controlled device;
   an operating-system-controlled device; and
   a system
   and wherein the computing device is capable of running executable code of the POS created using one of the following steps:
   creating executables for the POS as a PE as in claim 1;
   creating executables for the POS as an EUC as in claim 4; and
   creating executables for the POS as a PEUC as in claim 7.

24. The method of claim 23, further comprising running the Polymorphic Operating System (POS) in the computing device.

25. A programming and compilation tool configured to convert source code of a program according to at least one of the following steps for making executable code in a Polymorphic Code Section of an executable:
   (1) Converting source code making a memory reference to a global variable in the Polymorphic Code Section to making a memory reference to the global variable with a wrapper;
   (2) Converting source code making a memory reference to a static local variable in the Polymorphic Code Section by replacing the static local variable with the global variable, and repeating step (1) to make the memory reference to the global variable with the wrapper;
   (3) Converting source code using a static string in the Polymorphic Code Section to using the static string with the wrapper; and
   (4) Converting pointers to a function or the global variable in the Polymorphic Code Section to pointers to the function or the global variable with the wrapper.

26. A method for nesting Polymorphic Code Sections to create executables in a Polymorphic Executable format, in an Executable with Unexecutable Code format, or in a Polymorphic Executable with Unexecutable Code format, the executables comprising executable code embedded into hardware of a computing device, or stored in a storage medium wherein the storage medium is one or more of:
   a read-only storage medium;
   a rewriteable storage medium;
   a volatile or non-volatile storage medium;
   a virtual disk in physical memory;
   internal Dynamic Random Access Memory;
   a hard disk;
   a solid state flash disk;
   Read Only Memory;
   a read only or rewriteable CD or DVD or HD-DVD or Blu-Ray DVD; and
   a hardware chip or chipset,
   wherein the nesting is implemented in executable instructions.

27. A method for embedding hidden encryption and decryption algorithms within nested Polymorphic Code Polymorphic Code Sections to create executables in a Polymorphic Executable format, in an Executable with Unexecutable Code format, or in a Polymorphic Executable with Unexecutable Code format, the executables comprising executable code embedded into hardware of a computing device, or stored in a storage medium wherein the storage medium is one or more of:
   a read-only storage medium;
   a rewriteable storage medium;
   a volatile or non-volatile storage medium;
   a virtual disk in physical memory;
   internal Dynamic Random Access Memory;
   a hard disk;
   a solid state flash disk;
   Read Only Memory;
   a read only or rewriteable CD or DVD or HD-DVD or Blu-Ray DVD; and
   a hardware chip or chipset,
   wherein the embedding is implemented in executable instructions.

28. A method for implementing multiple passes of encryption and decryption to create executables in a Polymorphic
   Executable format, in an Executable with Unexecutable Code format, or in a Polymorphic Executable with Unexecutable Code format, the executables comprising executable code embedded into hardware of a computing device, or stored in a storage medium wherein the storage medium is one or more of:
   a read-only storage medium;
   a rewriteable storage medium;
   a volatile or non-volatile storage medium;
   a virtual disk in physical memory;
   internal Dynamic Random Access Memory;
   a hard disk;
   a solid state flash disk;
   Read Only Memory;
   a read only or rewriteable CD or DVD or HD-DVD or Blu-Ray DVD; and
   a hardware chip or chipset,
   wherein the multiple passes are implemented in executable instructions.

29. A method for encryption and decryption using a plurality of encryption and decryption algorithms for creating executables in a Polymorphic Executable format, in an Executable with Unexecutable Code format, or in a Polymorphic Executable with Unexecutable Code format, the executables comprising executable code embedded into hardware of a computing device, or stored in a storage medium wherein the storage medium is one or more of:
   a read-only storage medium;
   a rewriteable storage medium;
   a volatile or non-volatile storage medium;

a virtual disk in physical memory;
internal Dynamic Random Access Memory;
a hard disk;
a solid state flash disk;
Read Only Memory;
a read only or rewriteable CD or DVD or HD-DVD or Blu-Ray DVD; and
a hardware chip or chipset,
wherein the encryption and decryption is implemented in executable instructions.

30. A method for dynamic single pass and/or multiple pass encryption and decryption with or without the use of stacking,
wherein encryption, decryption, re-encryption, and re-decryption of a Polymorphic Code Section is performed while an executable of the Polymorphic Code Section is being executed,
wherein the encryption and decryption creates executables in a Polymorphic Executable format, in an Executable with Unexecutable Code format, or in a Polymorphic Executable with Unexecutable Code format, the executables comprising executable code embedded into hardware of a computing device, or stored in a storage medium wherein the storage medium is one or more of:
a read-only storage medium;
a rewriteable storage medium;
a volatile or non-volatile storage medium;
a virtual disk in physical memory;
internal Dynamic Random Access Memory;
a hard disk;
a solid state flash disk;
Read Only Memory;
a read only or rewriteable CD or DVD or HD-DVD or Blu-Ray DVD; and
a hardware chip or chipset,
and wherein the encryption and decryption is implemented in executable instructions.

31. A non-transitory computer-readable storage medium having executable instructions for a Polymorphic Executable (PE) stored thereon, the instructions being runnable in a computing device or processing environment, the PE comprising:
a General Code Section including executable code in an unencrypted format that is executable without encryption; and
a Polymorphic Code Section including polymorphic code, wherein the polymorphic code is:
runnable, but different, in different authenticated or authorized states; and
not runnable in unauthenticated or unauthorized states.

32. A non-transitory computer-readable medium having executable instructions for an Executable with Unexecutable Code (EUC) stored thereon, the instructions being runnable in a computing device or processing environment, the EUC comprising:
a General Code Section including executable code in an unencrypted format that is executable without decryption; and
an Unexecutable Code Section including unexecutable code to be replaced by corresponding polymorphic code upon execution by the computing device,
wherein the polymorphic code is:
runnable, but different, in different authenticated or authorized states; and
not runnable in unauthenticated or unauthorized states.

33. A non-transitory computer-readable medium having executable instructions for a Polymorphic Executable with Unexecutable Code (PEUC) stored thereon, the instructions being runnable in a computing device or processing environment, the PEUC comprising:
a General Code Section including executable code in an unencrypted format that is executable without encryption or decryption;
a Polymorphic Code Section including polymorphic code, wherein the polymorphic code is:
runnable, but different, in different authenticated or authorized states; and
not runnable in unauthenticated or unauthorized states; and
an Unexecutable Code Section including unexecutable code to be replaced by corresponding polymorphic code upon execution.

34. A non-transitory computer-readable medium having instructions of a Polymorphic Operating System stored thereon, the instructions being runnable as executables in a computing device or processing environment, the executables comprising different combinations or different degrees of mixture of:
at least one of a Polymorphic Executable (PE), an Executable with Unexecutable Code (EUC), and a Polymorphic Executable with Unexecutable Code (PEUC); and
at least one ordinary executable.

35. The computer-readable medium of claim 34, wherein the at least one of the PE, the EUC, and the PEUC includes an extractable Polymorphic Code Section and corresponding extractable locational information.

* * * * *